(12) United States Patent
Suzuki et al.

(10) Patent No.: US 7,038,349 B2
(45) Date of Patent: May 2, 2006

(54) STATOR FOR DYNAMO-ELECTRIC MACHINE

(75) Inventors: Mikitsugu Suzuki, Hoi-gun (JP); Seiya Yokoyama, Toyohashi (JP)

(73) Assignee: Asmo Co., Ltd., Shizuoka-Pref. (JP)

( * ) Notice: Subject to any disclaimer, the term of this patent is extended or adjusted under 35 U.S.C. 154(b) by 0 days.

(21) Appl. No.: 10/800,832

(22) Filed: Mar. 16, 2004

(65) Prior Publication Data

US 2004/0183393 A1    Sep. 23, 2004

(30) Foreign Application Priority Data

Mar. 18, 2003   (JP) .............................. 2003-073552

(51) Int. Cl.
*H02K 1/06* (2006.01)
*H02K 1/18* (2006.01)

(52) U.S. Cl. ...................... 310/216; 310/218; 310/259

(58) Field of Classification Search ........ 310/216–218, 310/254, 259
See application file for complete search history.

(56) References Cited

U.S. PATENT DOCUMENTS 3,978,356 A * 8/1976 Spiesberger ........... 310/156.42
6,348,753 B1 * 2/2002 Sakai et al. ................. 310/254

FOREIGN PATENT DOCUMENTS

| JP | 63-174531 | * 7/1988 | ................. 310/218 |
| JP | 2-7839 | * 1/1990 | ................. 310/218 |
| JP | A-9-19089 | 1/1997 | |
| JP | A-2000-350389 | 12/2000 | |

* cited by examiner

*Primary Examiner*—Tran Nguyen
(74) *Attorney, Agent, or Firm*—Posz Law Group, PLC

(57) ABSTRACT

In a stator, each bridge of each inner core sheet includes a thin wall portion, which extends in a circumferential direction of the stator and has a smaller axial thickness in a direction parallel to the axial direction of the stator in comparison to the rest of the inner core sheet. A circumferential angular extent of at least one of the thin wall portions of the bridges differs from that of at least another one of the thin wall portions of the bridges in each inner core sheet.

24 Claims, 19 Drawing Sheets

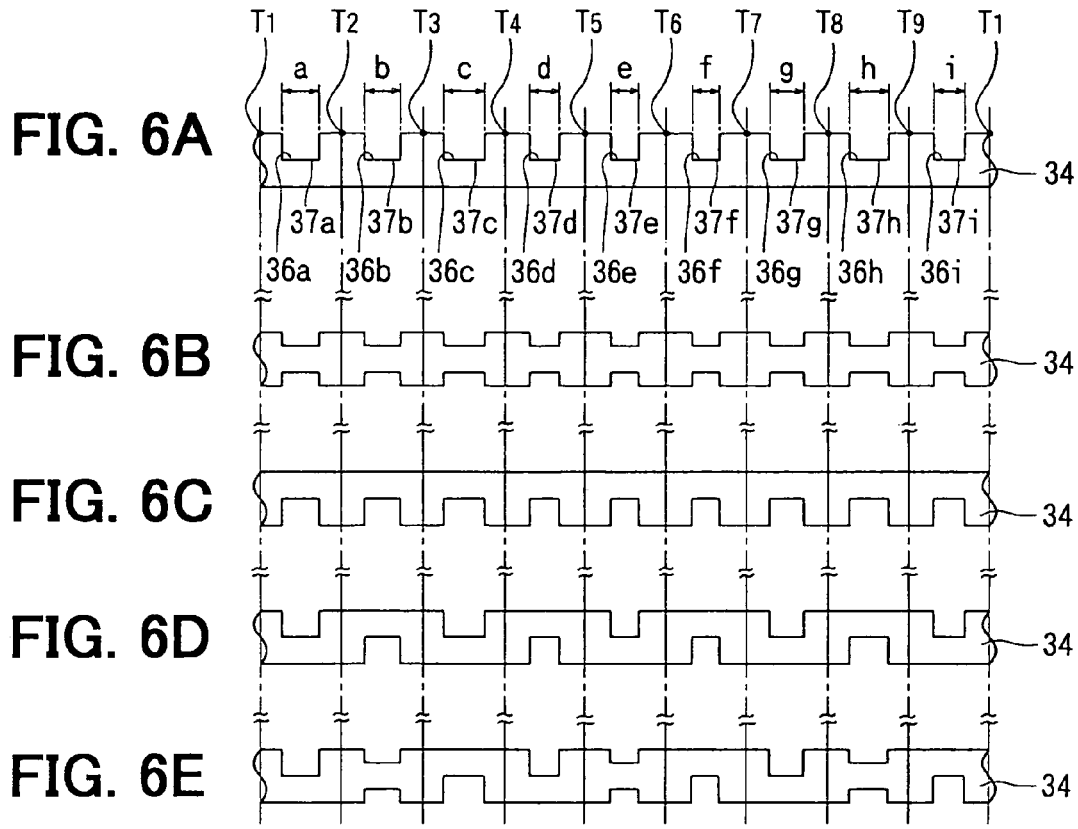

STATOR FOR DYNAMO-ELECTRIC MACHINE

CROSS REFERENCE TO RELATED APPLICATION

This application is based on and incorporates herein by reference Japanese Patent Application No. 2003-73552 filed on Mar. 18, 2003 and Japanese Patent Application No. 2004-65941 filed on Mar. 9, 2004.

BACKGROUND OF THE INVENTION

1. Field of the Invention

The present invention relates to a stator for a dynamo-electric machine.

2. Description of Related Art

In one type of electric motor (dynamo-electric machine), such as a brushless motor, a rotating magnetic field is generated when electric current is sequentially supplied to coils wound around iron core portions, respectively, of a stator. A rotor is rotated through interaction between the thus generated rotating magnetic field and a magnetic filed generated by magnets or coils of the rotor. In a case of an inner rotor type electric motor, the iron core portions of the stator are arranged radially outward of the rotor, and the coils are wound around the iron core portions, each of which serves as a winding core of the corresponding coil.

In the above stator, core sheets, each of which is made of a thin magnetic plate material, such as a silicon steel plate, are axially stacked one after the other. Such a stator includes a pillar like inner core and a cylindrical outer core. The inner core includes iron core portions and bridges. The iron core portions are arranged radially outward of the rotor, and each bridge connects between radially inner ends of corresponding two of iron core portions. The outer rotor connects radially outer ends of the iron core portions of the inner core together. Each of the inner core and the outer core is formed by stacking the corresponding core sheets, and thereafter the inner core and the outer core are connected together to form the stator.

When the stator is formed by connecting the two separate cores together, the coils can be easily wound around the radially outwardly extending iron core portions upon formation of the inner core through the stacking of the inner core sheets. Thus, the winding operation of the coils to the iron core portions is facilitated. After the winding operation of the coils, the outer core, which is formed by stacking the outer core sheets, is secured to the inner core, to which the coils are wound, and thereby the stator is formed.

In the thus constructed stator, the iron core portions are connected by the bridges. Thus, a portion of a magnetic flux, which is generated by the magnets of the rotor, passes through the bridges and thereby is leaked through the bridges. The leaked magnetic flux does not contribute to rotation of the rotor, so that the leaked magnetic flux has negative influences on a reduction in a size of the motor and an increase in an output power of the motor.

In order to compensate the above disadvantages, Japanese Unexamined Patent Publication No. 9-19089 discloses a stator, in which an axial thickness of each bridge is reduced in comparison to an axial thickness of the rest of the core sheet to reduce an effective cross sectional area of a magnetic passage that conducts a magnetic flux in the bridge. In this way, a magnetic resistance of the magnetic passage is increased, and the leakage of the magnetic flux is limited.

With this arrangement, the magnetic flux is less likely leaked through the bridges, and thereby non-effective magnetic flux, which does not contribute to the rotation of the motor, can be advantageously reduced. Thus, it is possible to increase the output power of the motor and to reduce the size of the motor.

However, in the above motor, although the leakage of the magnetic flux is reduced to increase the output power of the motor by reducing the axial thickness of each bridge, cogging torque (oscillating torque) of the motor is disadvantageously increased due to the reduced axial thickness of each bridge. The cogging torque disadvantageously causes generation of noises and vibrations in the motor.

SUMMARY OF THE INVENTION

The present invention addresses the above disadvantages. Thus, it is an objective of the present invention to provide a stator, which improves an output power of a motor having the stator and minimizes noises and vibrations generated upon rotation of the motor.

To achieve the objective of the present invention, there is provided a stator for a dynamo-electric machine. The stator includes a cylindrical outer core and an inner core. The inner core includes a plurality of inner core sheets stacked one after the other in an axial direction of the stator. Each inner core sheet includes a plurality of iron core portions and a plurality of bridges. Each iron core portion extends radially inward from the outer core to hold a corresponding coil of the dynamo-electric machine. Each bridge connects between radially inner ends of corresponding two of the plurality of iron core portions. Each bridge of each inner core sheet includes a thin wall portion, which extends in a circumferential direction of the stator and has a smaller axial thickness in a direction parallel to the axial direction of the stator in comparison to the rest of the inner core sheet. In one case, a circumferential angular extent of at least one of the thin wall portions of the plurality of bridges may differ from that of at least another one of the thin wall portions of the plurality of bridges in each inner core sheet. In another case, a circumferential center of the thin wall portion of each bridge may be circumferentially displaced from a circumferential center of the bridge by a corresponding displacement angle in each inner core sheet. In another case, all circumferential angular extents of the thin wall portions of the plurality of bridges may be generally identical to one another in each corresponding inner core sheet, and the circumferential angular extent of one of every axially adjacent two of the thin wall portions of the inner core sheets may differ from the circumferential angular extent of the other one of the every axially adjacent two of the thin wall portions.

BRIEF DESCRIPTION OF THE DRAWINGS

The invention, together with additional objectives, features and advantages thereof, will be best understood from the following description, the appended claims and the accompanying drawings in which:

FIG. 6A is a schematic exploded view of one type of inner core sheet of the first embodiment;

FIG. 6B is a schematic exploded view of another type of inner core sheet of the first embodiment;

FIG. 6C is a schematic exploded view of another type of inner core sheet of the first embodiment;

FIG. 6D is a schematic exploded view of another type of inner core sheet of the first embodiment;

FIG. 6E is a schematic exploded view of another type of inner core sheet of the first embodiment;

DETAILED DESCRIPTION OF THE INVENTION (First Embodiment)

Figure 1:
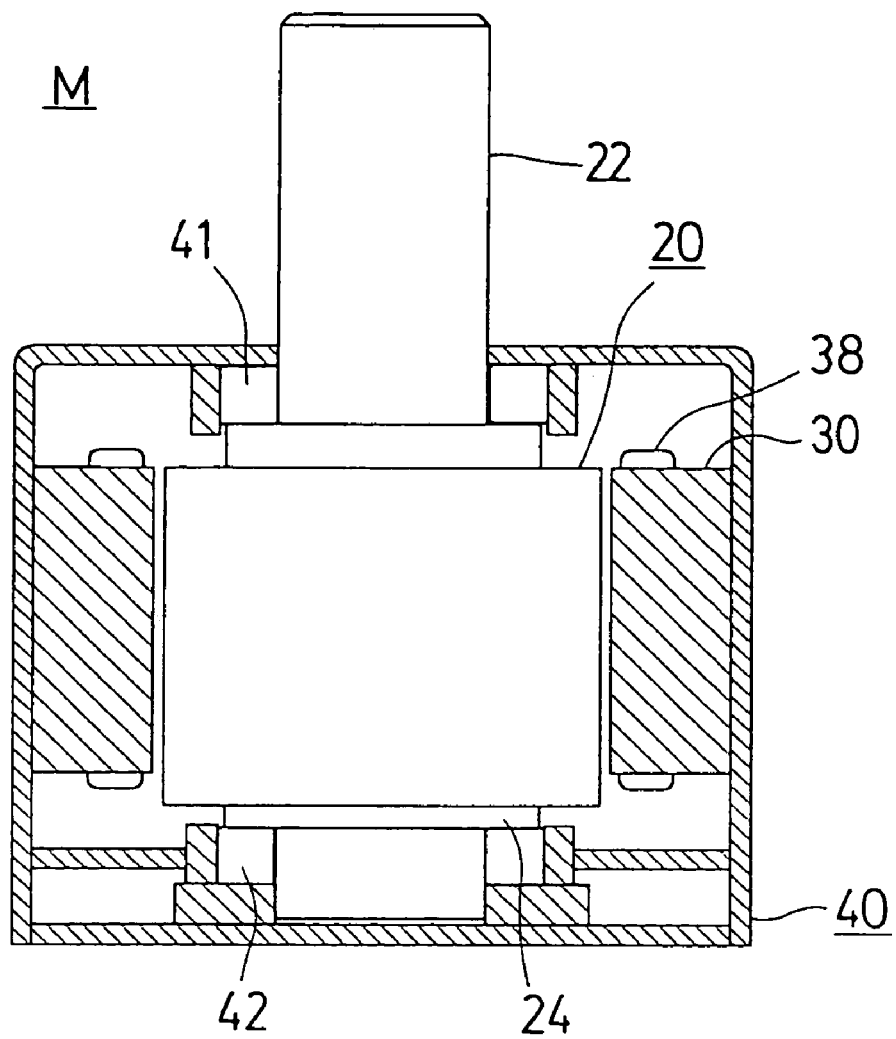
FIG. 1 is a schematic cross sectional view of a brushless motor according to a first embodiment of the present invention.

An inner rotor type brushless motor (dynamo-electric machine) M according to a first embodiment of the present invention will be described with reference to FIG. 1. The brushless motor M includes a rotor 20, bearings 41, 42, a stator 30 and a housing 40. A rotatable shaft 22 is secured to the rotor 20. The bearings 41, 42 rotatably support the rotor 20. The stator 30 is arranged radially outward of the rotor 20. Coils 38 (coils 38U, 38V, 38W), which respectively provide three phase exciting currents (U-phase, V-phase and W-phase), are wound around the stator 30. The housing 40 receives these components.

Although not depicted in the drawings, the brushless motor M further includes a known position sensor and a control circuit to sense a position of the rotating rotor 20. The position sensor includes a Hall element, a commutating element and a position sensing magnet. Based on a position signal obtained through the position sensor and the control circuit and a preset rotational speed of the rotor 20, the control circuit applies electric current to each phase coil 38. Thus, a rotating magnetic field is generated in the stator 30, and thereby the rotor 20 is rotated in a stable manner.

Figure 2:
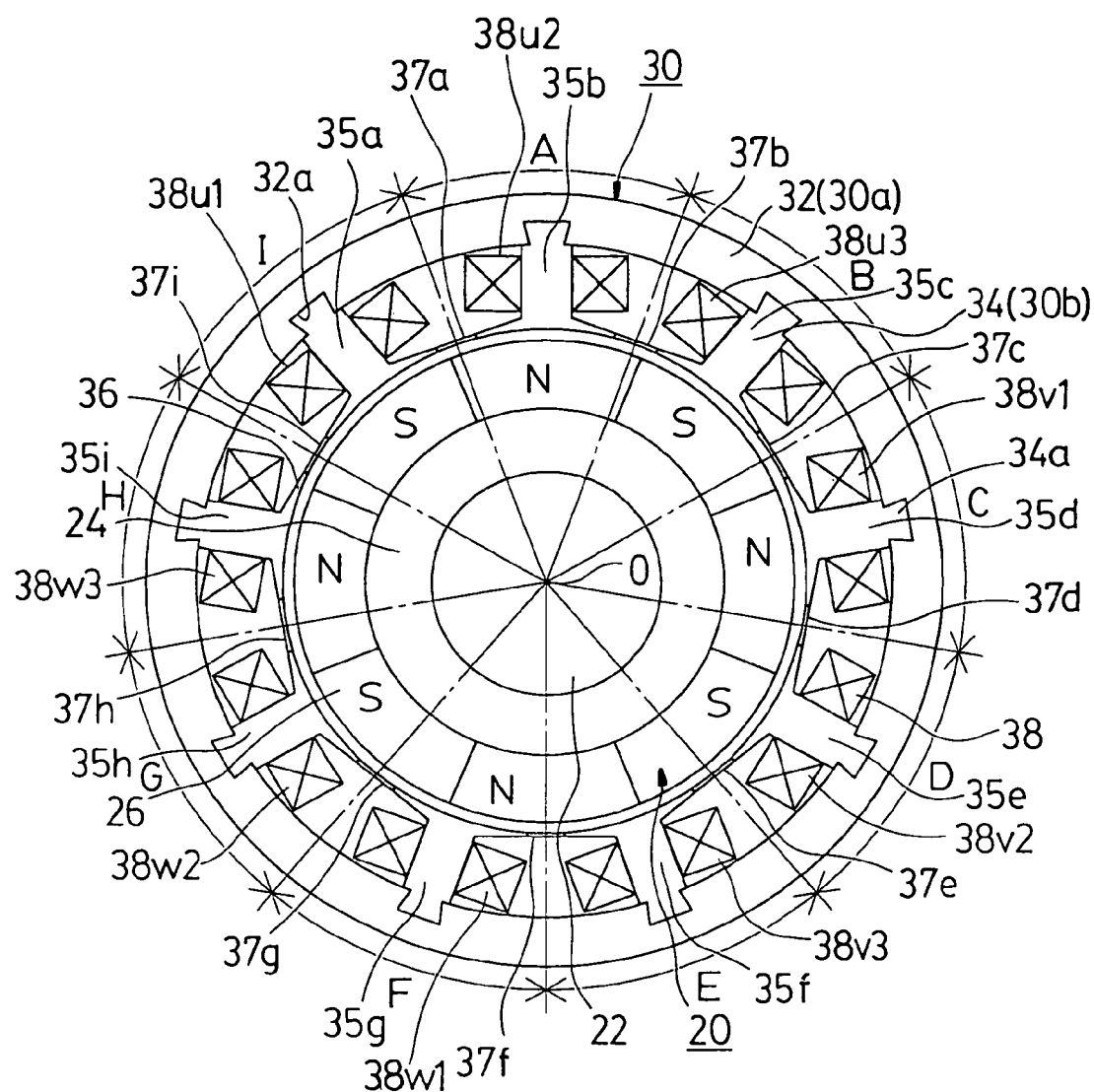
FIG. 2 is a schematic cross sectional view showing a stator and a rotor of the brushless motor of the first embodiment.

FIG. 2 shows a cross sectional view of the rotor 20 and of the stator 30. In the rotor 20, the rotatable shaft 22 is connected to a shaft 24, and magnets 26 are arranged along an outer peripheral surface of the shaft 24. Each magnet 26 is formed as a slightly curved plate and is magnetized in such a manner that a magnetic flux of the magnet 26 is directed in a thickness direction of the magnet 26 (i.e., in a radial direction of the rotor 20).

The rotor 20 of the present embodiment includes eight poles. Two types of magnets 26, which have different magnetic flux directions, are alternately arranged at 45 degree intervals along the outer peripheral surface of the rotor 20.

Figure 3:
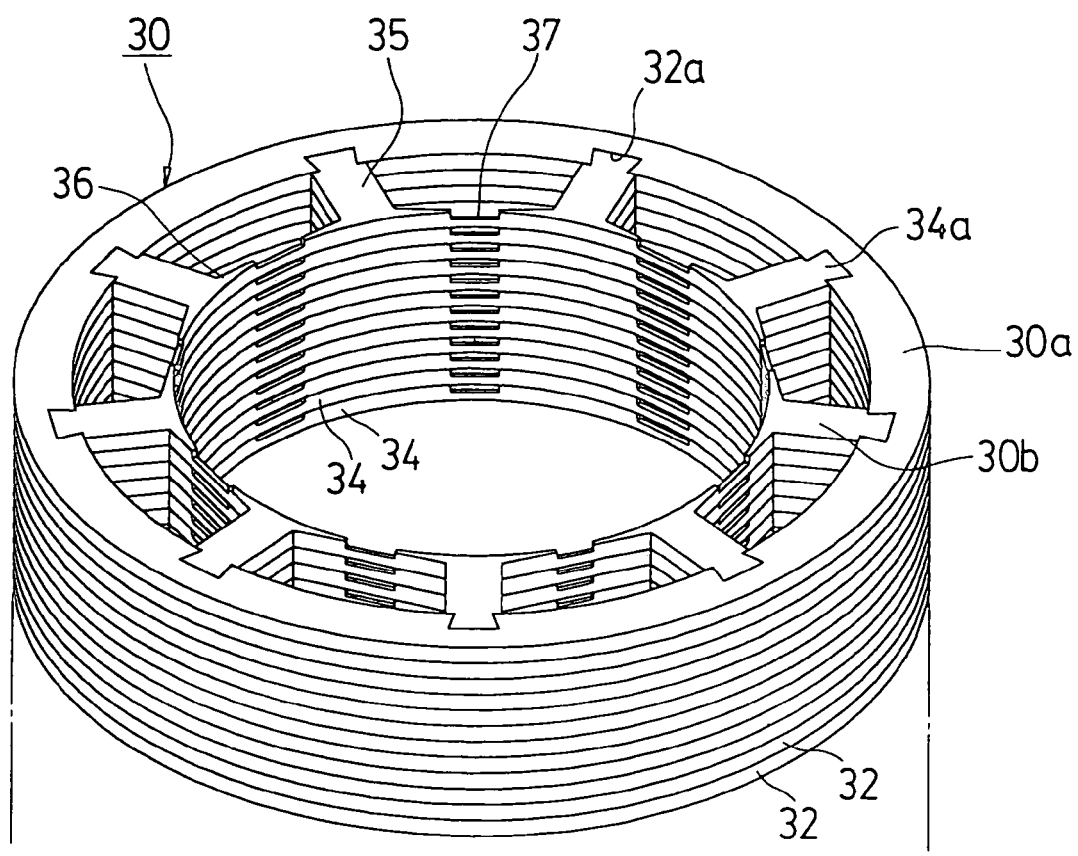
FIG. 3 is a partial perspective view of a stator core of the stator of the first embodiment.

As shown in FIGS. 2 and 3, the stator 30 includes a stator core and the coils 38 (coils 38U, 38V, 38W). The stator core includes an outer core 30a and an inner core 30b, which are formed by stacking thin outer core sheets 32 and thin inner core sheets 34, respectively. Each of the outer core sheet 32 and the inner core sheet 34 is formed into a corresponding predetermined shape by press working of a thin magnetic plate material, such as a silicon steel plate, which has a predetermined thickness and which is electrically insulated by, for example, a dielectric film applied to surfaces of the silicon steel plate.

Each outer core sheet 32 is formed into a ring shape and has a plurality of recessed engaging portions 32a, which are arranged at 40 degree intervals along an inner peripheral surface of the outer core sheet 32. Each inner core sheet 34 includes nine iron core portions 35a–35i (i.e., the number of salient magnetic poles is nine) and a plurality of bridges 36. The iron core portions 35a–35i are arranged at 40 degree intervals. Each bridge 36 connects between corresponding two adjacent radially inner ends of corresponding two adjacent iron core portions 35a–35i. A tab tail 34a is formed in a radially outer end of each iron core portion 35a–35i and is engaged with a corresponding one of the engaging portions 32a of the outer core sheet 32.

Each bridge 36 is thinned in a radial direction. Furthermore, the bridges 36 integrally support the iron core portions 35a–35i by integrally connecting the iron core portions 35a–35i. A thin wall portion 37a–37i is formed in a circumferential center of each bridge 36. Each thin wall portion 37a–37i is thinner than the rest of the inner core sheet 34 in an axial direction perpendicular to a plane of the inner core sheet 34 and has a predetermined circumferential angular extent. When the inner core sheet 34 is cut out from the corresponding magnetic plate material into the predetermined shape in the press work, and then each thin wall portion 37a–37i is pressed in the axial direction perpendicular to the plane of the inner core sheet 34, an axial thickness of each thin wall portion 37a–37i becomes about one half of an axial thickness of the rest of the inner core sheet 34.

The stator 30 is made of the outer core sheets 32 and the inner core sheets 34 and is thus formed as a laminated iron core. When the outer core sheets 32 and the inner core sheets 34 are coaxially stacked one after the other, the cylindrical outer core 30a and the pillar like inner core 30b are formed. The coils 38 are wound around the iron core portions 35a–35i, and the tab tails 34a of the inner core 30b are press fitted into the engaging portions 32a of the outer core 30a. Thus, the outer core 30a and the inner core 30b are integrally secured.

One of the iron core portion 35a–35i, which is located in the ten o'clock position in FIG. 2, is referred to as an iron core portion 35a, and the rest of the iron core portions 35b–35i are sequentially arranged in this order after the iron core portion 35a in a clockwise direction. Furthermore, one of the thin wall portion 37a–37i, which is located in the eleven o'clock position in FIG. 2, is referred to as a thin wall portion 37a, and the rest of the thin wall portions 37b–37i are sequentially arranged in this order after the thin wall portion 37a at about 40 degree intervals in the clockwise direction.

In the brushless motor M of the present embodiment, coils 38U1–38U3 are wound around the iron core portions 35a–35c, respectively, in a form of concentrated winding to form a coil arrangement 38U. Similarly, coils 38V1–38V3 are wound around the iron core portions 35d–35f, respectively, in a form of concentrated winding to form a coil arrangement 38V. Also, coils 38W1–38W3 are wound around the iron core portions 35g–35i, respectively, in a form of concentrated winding to form a coil arrangement 38W.

The coils 38U1, 38U3, 38V1, 38V3, 38W1, 38W3 are wound in a common direction, and the other coils 38U2, 38V2, 38W2 are wound in an opposite direction, which is opposite from the common direction.

In the stator 30, which is constructed in the above manner, each stacked portion of the stator 30, in which the corresponding thin wall portions 37a–37i are axially stacked one after the other, radial through holes and walls are alternately arranged in the axial direction. Thus, the actual total wall thickness of each corresponding portion of the stator 30, which corresponds to a corresponding one of the thin wall portions 37a–37i, is thinner than the rest of the stator 30, i.e., is about one half of that of the rest of the stator 30.

Thus, in each corresponding portion of the stator 30, which corresponds to the corresponding one of the thin wall portions 37a–37i, an effective cross sectional area of a magnetic passage for conducting a magnetic flux is substantially reduced to increase a magnetic resistance. The magnetic flux, which is generated from the magnets 26 of the rotor 20 and flows through the stator 30, will have a reduced flux leakage, which passes through the bridges 36 toward the adjacent magnets 26. Thus, the effective magnetic flux, which passes through the iron core portions 35a–35i, can be advantageously increased. Therefore, an increased output power of the brushless motor M is achieved.

In each inner core sheet 34, the iron core portions 35a–35i are arranged at generally equal angular intervals (about 40 degree intervals) in the circumferential direction. Furthermore, each thin wall portion 37a–37i, which has the predetermined circumferential angular extent, is formed generally in the circumferential center of the corresponding bridge 36, which connects between the corresponding adjacent iron core portions 35a–35i. Thus, a circumferential center of the each thin wall portion 37a–37i generally coincides with a circumferential center between corresponding adjacent two of the iron core portions 35a–35i, i.e., generally coincides with a circumferential center of the corresponding bridge 36.

As shown in FIG. 2, an angle, which is defined between the circumferential center of the thin wall portion 37a located in the eleven and one half o'clock position and the circumferential center of the thin wall portion 37b located in the twelve and one half o'clock position, will be referred to as an angle A. Each of angles B–I in FIG. 2 is defined between the circumferential centers of the corresponding adjacent two thin wall portions 37a–37i in a manner similar to that of the angle A. The angles A–I are generally uniform (about 40 degrees).

However, all the circumferential angular extents of the thin wall portions 37a–37i are not uniform. More specifically, the circumferential angular extents of the thin wall portions 37a–37i are set to be about 11 degrees, about 10 degrees, about 12 degrees, about 9 degrees, about 11 degrees, about 8 degrees, about 10 degrees, about 12 degrees and about 9 degrees, respectively. An average value of the circumferential angular extents of the thin wall portions 37a–37i is about 10.2 degrees.

Figure 4:
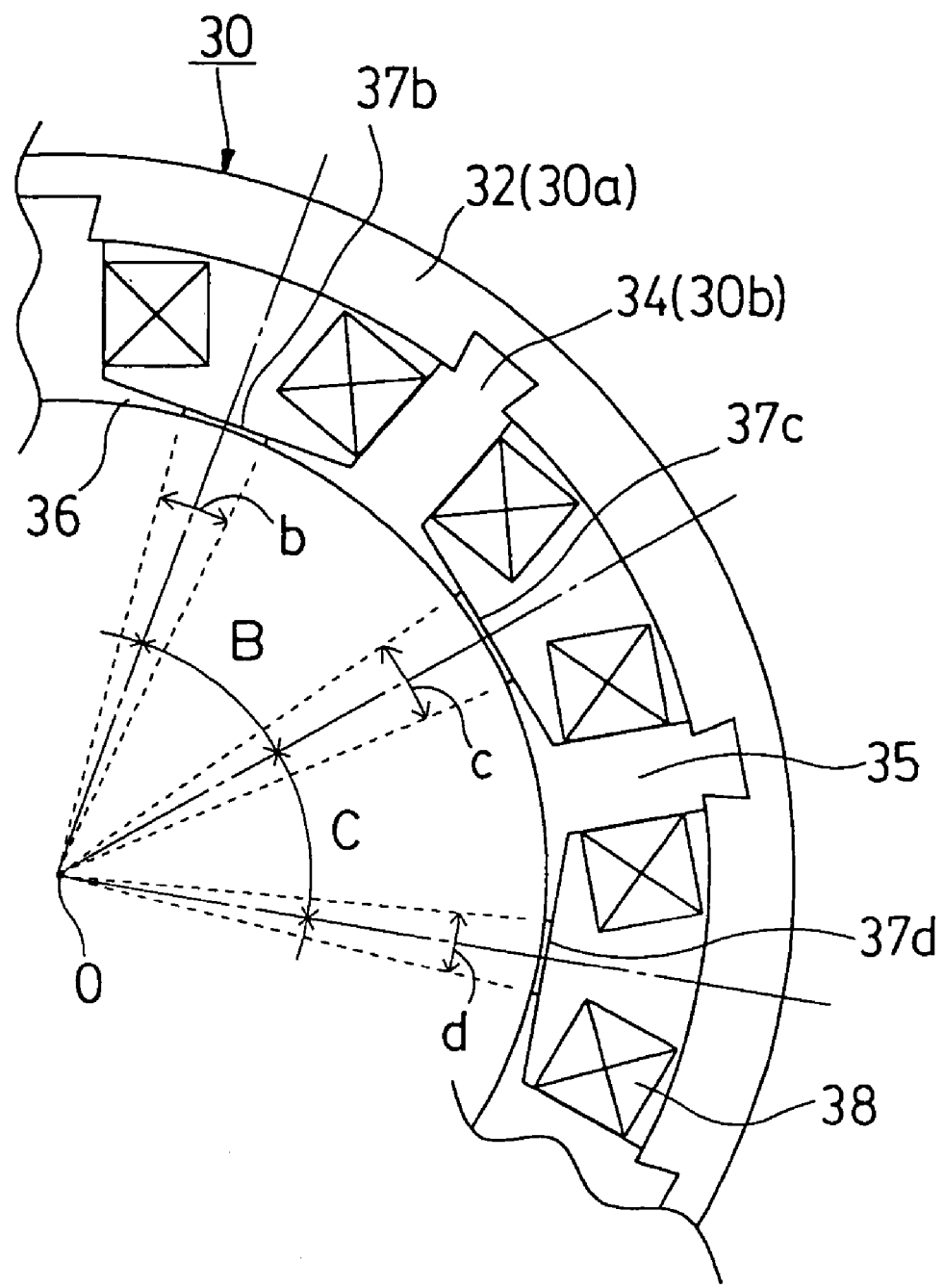
FIG. 4 is a partial enlarged schematic cross sectional view of the stator of the first embodiment.

FIG. 4 shows a partially enlarged view of FIG. 2. With reference to FIG. 4, when the circumferential angular extents of the thin wall portions 37b–37d are indicated by angles b–d, respectively, the angles b–d are about 10 degrees, about 12 degrees and about 9 degrees, respectively. Furthermore, although not depicted in FIG. 4, the circumferential angular extent of the thin wall portion 37a, which is circumferentially held between the iron core portion 35a and the iron core portion 35b, is indicated by an angle a. Similarly, the circumferential angular extents of the thin wall portions 37e–37i will be indicated by angles e–i.

The inner core sheets 34, each of which includes the thin wall portions 37a–37i, are axially stacked one after the other without angular displacement of the inner core sheets 34. Thus, the thin wall portions 37a, which have the circumferential angular extents (i.e., about 11 degrees), respectively, that are generally identical to one another, are axially stacked one after the other at the corresponding predetermined angular position to form the inner core 30b. Other thin wall portions 37b–37i are similarly axially stacked. The effective magnetic flux (or an output power) of the brushless motor M of the present embodiment is comparable to that of a brushless motor, in which each of thin wall portions has a uniform circumferential angular extent of about 10.2 degrees.

Figure 5:
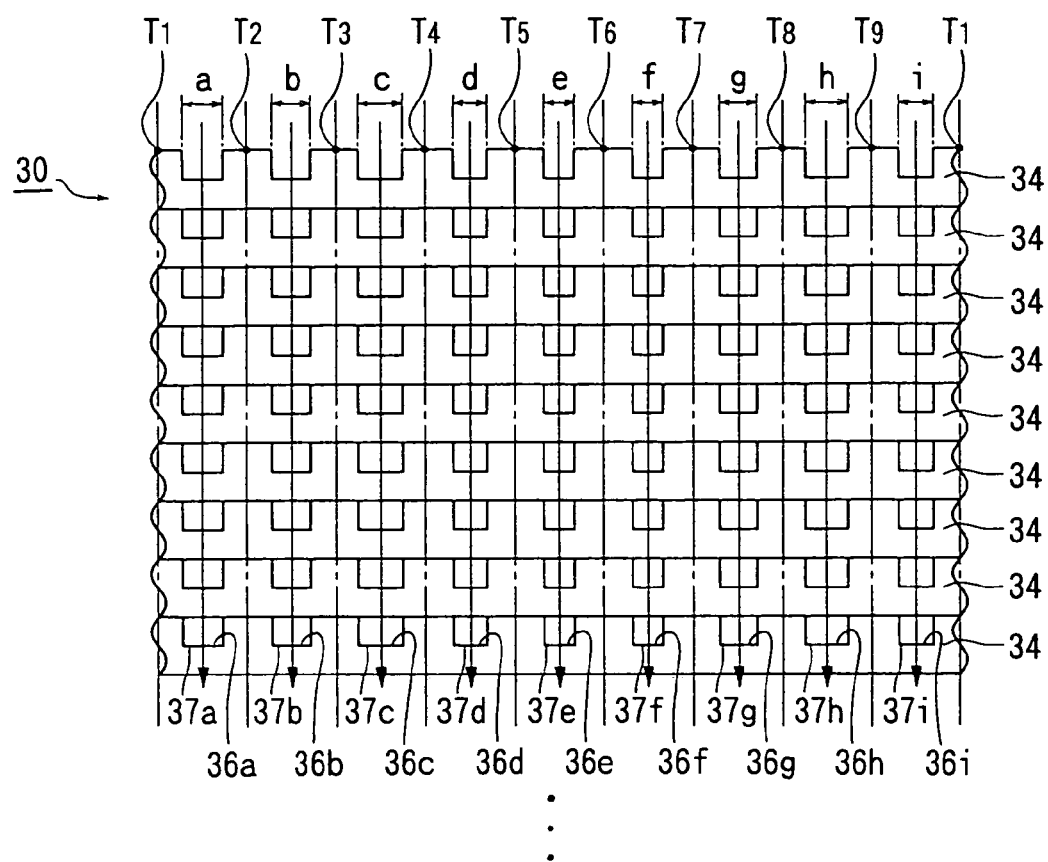
FIG. 5 is a partial schematic exploded view of the stator of the first embodiment.

In the above stator 30, some of the thin wall portions 37a–37i of each inner core sheet 34 have the identical circumferential angular extent. However, the present invention is not limited to this arrangement. For example, all the circumferential angular extents of the thin wall portions 37a–37i may differ from one another, as shown in FIG. 5. FIG. 5 is an exploded view of the inner core 30b seen from a rotational axis of the inner core 30b to show an inner peripheral surface of the inner core 30b. In FIG. 5, numerals T1–T9 indicate the circumferential centers of the iron core portions 35a–35i, respectively.

In the case of FIG. 5, each inner core sheet 34 is constructed such that all the angles a–i differ from one another. Here, the angles a–i are set to be about 11 degrees, about 10.5 degrees, about 12 degrees, about 9 degrees, about 8.5 degrees, about 8 degrees, about 10 degrees, about 11.5 degrees and about 9.5 degrees, respectively. In this case, an average value of the circumferential angular extents of these thin wall portions 37a–37i is about 10 degrees. The inner core sheets 34 are stacked one after the other without angular displacement of the inner core sheets 34. Thus, the thin wall portions 37a, which have the circumferential angular extents (i.e., about 11 degrees), respectively, that are generally identical to one another, are axially stacked one after the other at the corresponding predetermined angular position to form the inner core 30b. Other thin wall portions 37b–37i are similarly axially stacked.

Even in the case of FIG. 5, each thin wall portion 37a–37i is formed in such a manner that the circumferential center of the thin wall portion 37a–37i generally coincides with the circumferential center between corresponding adjacent two of the iron core portions 35a–35i, i.e., generally coincides with the circumferential center of the corresponding bridge 36.

The number of torque oscillations in the cogging torque per rotation of the rotor is equal to a least common multiple of the number of poles of magnets and the number of salient poles. Furthermore, a size of the cogging torque is inversely proportional to the number of the torque oscillations in the cogging torque. In the case of the present embodiment, the number of poles of the magnets 26 is eight, and the number of iron core portions 35a–35i is nine. Thus, the number of the torque oscillations in the cogging torque per rotation of the rotor 20 becomes relatively large (in the present embodiment, the number of torque oscillations per rotation of the rotor 20 is seventy two), and the size of the cogging torque becomes relatively small.

Furthermore, in the brushless motor M of the preset embodiment, the thin wall portions 37a–37i are formed in such a manner that all the circumferential angular extents of the thin wall portions 37a–37i differ from one another. Thus, the seventy two torque oscillations per rotation of the rotor 20 do not show an identical change pattern, and thereby there exists a plurality of different change patterns of the torque oscillation.

More specifically, when all the circumferential angular extents of the thin wall portions 37a–37i are identical, the torque oscillations in the cogging torque should be concentrated in a single frequency component. However, in the case of the present embodiment where the thin wall portions 37a–37i have different circumferential angular extents, magnetic interaction between the bridges 36 and the magnetic flux, which is generated from the magnets 26, and a rotational angle, at which the magnetic interaction takes place, differ from one bridge 36 to the next bridge 36. Thus, the torque oscillations are spread over multiple frequency components.

As a result, in the brushless motor M of the present embodiment, which is constructed in such a manner that all the circumferential angular extents of the thin wall portions 37a–37i differ from one another, the number (seventy two) of the torque oscillations in the cogging torque and an average size of the cogging torque are generally the same as those of the previously proposed brushless motor, in which all the circumferential angular extents of the thin wall portions 37a–37i are generally identical. However, in the brushless motor M of the present embodiment, the noises and vibrations, which are generated during the operation of the brushless motor M, are spread over the multiple frequency components and are thus reduced in comparison to the previously proposed motor.

As described above, in the brushless motor M of the present embodiment, the noises and vibrations, which are generated during the operation of the brushless motor M, are advantageously reduced in comparison to the previously proposed brushless motor by simply changing the circumferential angular extents of the thin wall portions 37a–37i. Thus, the brushless motor M of the present embodiment does not cause an increase in the manufacturing costs and also does not cause an increase in the number of the manufacturing steps.

In the stator 30 of the present embodiment, the circumferential angular extent of one of every circumferentially adjacent two of the thin wall portions 37a–37i differs from the circumferential angular extent of the other one of the every circumferentially adjacent two of the thin wall portions 37a–37i in each inner core sheet 34. However, the present invention is not limited to this. For example, in an alternative arrangement, the circumferential angular extent of at least one of the thin wall portions 37a–37i may differ from that of the rest of the thin wall portions 37a–37i.

Furthermore, in the first embodiment, as shown in FIGS. 3 and 5, each thin wall portion 37a–37i is formed in each inner core sheet 34 by providing a recess 36a–36i in one axial side (upper side in FIGS. 3 and 5) of the bridge 36. However, the present invention is not limited to this. For example, as shown in FIGS. 6A–6E, the recess 36a–36i can be formed in the other axial side (lower side in the drawings) of the bridge 36 or can be formed in both the axial sides of the bridge 36.

More specifically, FIG. 6A shows one of the core sheets 34 of FIG. 5. The angles a–i are set to be about 11 degrees, about 10.5 degrees, about 12 degrees, about 9 degrees, about 8.5 degrees, about 8 degrees, about 10 degrees, about 11.5 degrees and about 9.5 degrees, respectively.

In the case of the inner core sheet 34 shown in FIG. 6B, the recesses 36a–36i are formed in both the axial sides of the bridges 36 to provide the thin wall portions 37a–37i.

In the case of the inner core sheet 34 shown in FIG. 6C, the recesses 36a–36i are formed in the lower axial sides of the bridges 36 to provide the thin wall portions 37a–37i.

In the case of the inner core sheet 34 shown in FIG. 6D, the recesses 36a–36i are formed in both the axial sides of the bridges 36 to provide the thin wall portions 37a–37i. However, in this case, the upper ones of the recesses 36a–36i and the lower ones of the recesses 36a–36i are alternately arranged in the circumferential direction.

In the case of the inner core sheet 34 shown in FIG. 6E, the recesses 36a–36i are formed in both the axial sides of the bridges 36 to provide the thin wall portions 37a–37i. However, in the case, the bridge 36 with the single upper recess 36a–36i, the bridge 36 with both the upper and lower recesses 36a–36i and the bridge 36 with the single lower recess 36a–36i are alternately arranged in the circumferential direction.

Furthermore, in the inner core sheet 34 shown in FIGS. 6B–6E, the axial thicknesses and the circumferential angular extents of the thin wall portions 37a–37i are set to be the same as those of the thin wall portions 37a–37i of the FIG. 6A.

Furthermore, it is not required to regularly arrange the upper recesses 36a–36i and the lower recesses 36a–36i to form the thin wall portions 37a–37i, like in FIGS. 6D and 6E. For example, the upper recesses 36a–36i and the lower recesses 36a–36i can be randomly arranged to form the thin wall portions 37a–37i.

Figure 7A:
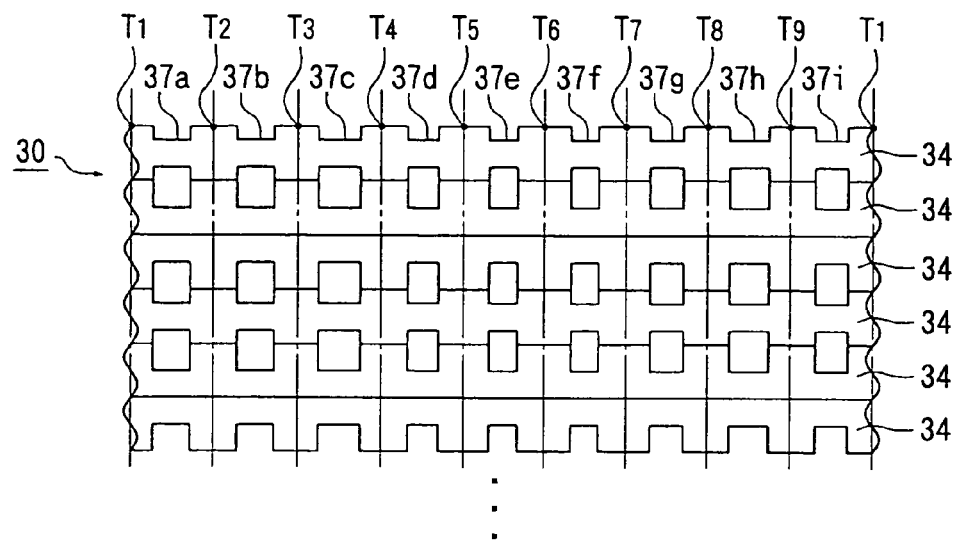
FIG. 7A is a schematic partial exploded view of one exemplary stator of the first embodiment.
Figure 7B:
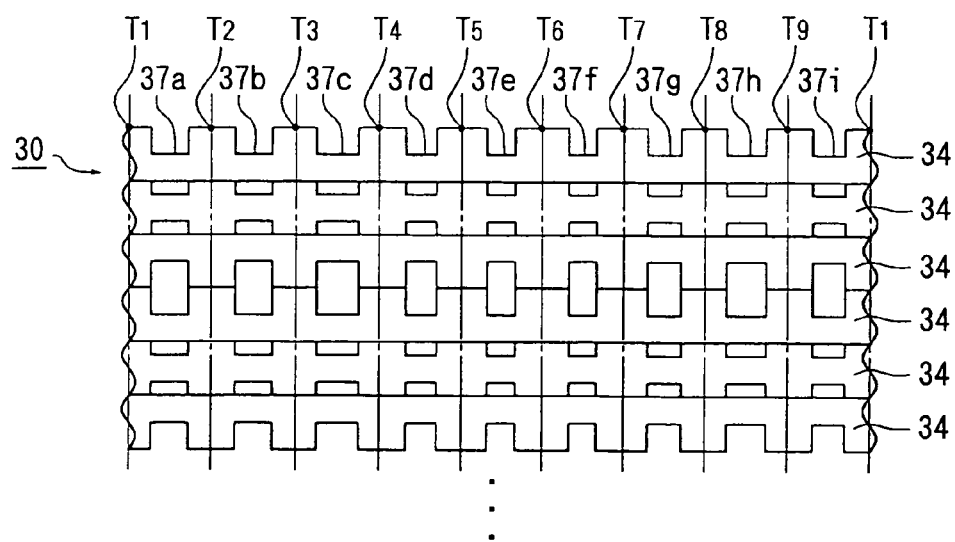
FIG. 7B is a schematic partial exploded view of another exemplary stator of the first embodiment.

FIGS. 7A and 7B show exemplary cases, in each of which three types of inner core sheets 34 shown in FIGS. 6A–6C, respectively, are used to form the stator 30 of FIG. 5.

More specifically, in the case of FIG. 7A, the inner core sheet 34 of FIG. 6B, the inner core sheet 34 of FIG. 6A and the inner core sheet 34 of FIG. 6C are repeatedly axially stacked in this order in the top to bottom direction of FIG. 7A to form the inner core 30*b*.

In the case of FIG. 7B, the inner core sheet 34 of FIG. 6A, the inner core sheet 34 of FIG. 6B and the inner core sheet 34 of FIG. 6C are repeatedly axially stacked in this order in the top to bottom direction of FIG. 7B to form the inner core 30*b*.

Figure 8A:
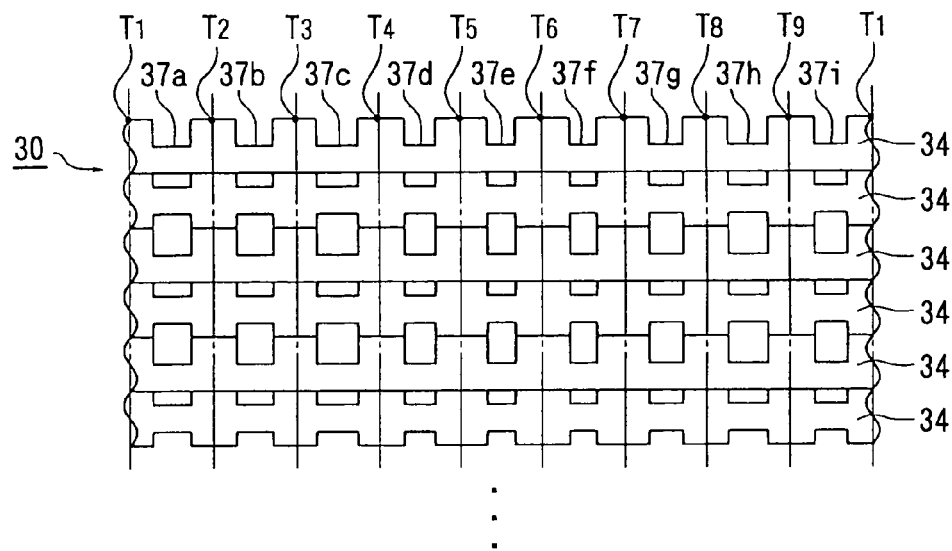
FIG. 8A is a schematic partial exploded view of another exemplary stator of the first embodiment.

FIG. 8A shows an exemplary case, in which two types of inner core sheets 34 shown in FIGS. 6A and 6B, respectively, are used to form the stator 30 of FIG. 5. In this case, the inner core sheet 34 of FIG. 6A and the inner core sheet 34 of FIG. 6B are repeatedly axially stacked in this order in the top to bottom direction in FIG. 8A to form the inner core 30*b*.

Figure 8B:
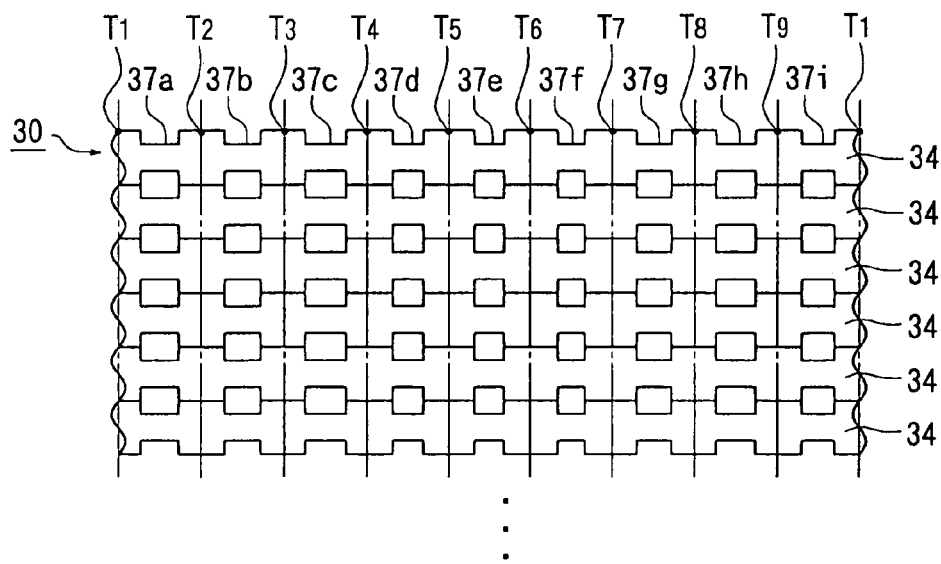
FIG. 8B is a schematic partial exploded view of another exemplary stator of the first embodiment.

FIG. 8B shows an exemplary case, in which the inner core sheet 34 of FIG. 6B is used to form the stator 30 of FIG. 5. In this case, the inner core sheets 34 of FIG. 6B are axially stacked to form the inner core 30*b*.

As discussed above, each thin wall portion 37*a*–37*i* of the inner core sheet 34 can be formed by forming the recess 36*a*–36*i* in any one of the axial upper side, the axial lower side and the both sides of each bridge 36.

Although not discussed in the following embodiments, it should be noted that the present invention covers the stator 30 that is formed by appropriately stacking the inner core sheets 34, such as the inner core sheets 34 of FIGS. 6A–6E, in each of which the recess 36*a*–36*i* is formed in one of the axial upper side, the axial lower side and the both sides of each bridge 36 to form the corresponding thin wall portion 37*a*–37*i*.

(Second Embodiment)

A second embodiment of the present invention will be described with reference to FIGS. 9–10. Components similar to those discussed above in the first embodiment will be indicated by similar numerals and will not be discussed further.

The rotor 20 of the second embodiment is substantially the same as the rotor 20 of the first embodiment and thus has eight magnetic poles. Similar to the stator 30 of the first embodiment, the stator 30 of the second embodiment includes nine iron core portions 35*a*–35*i*, which are arranged at generally equal angular intervals (about 40 degree intervals) in the circumferential direction.

Unlike the first embodiment, in which all the circumferential angular extents of the thin wall portions 37*a*–37*i* differ from one another in each inner core sheet 34, the circumferential angular extents of the thin wall portions 37*a*–37*i* of the stator 30 of the second embodiment are generally identical to one another (about 10 degrees).

Furthermore, the circumferential center of each thin wall portion 37*a*–37*i* of the first embodiment generally coincides with the circumferential center of the corresponding bridge 36. However, in the second embodiment, the circumferential center of each thin wall portion 37*a*–37*i* of the second embodiment is circumferentially displaced away from the circumferential center of the corresponding bridge 36 by a predetermined angle.

More specifically, in the second embodiment, each of the angles A–I is defined between the circumferential centers of the corresponding adjacent two thin wall portions 37*a*–37*i* in a manner similar to that of the first embodiment. The angles A–I are set to be about 38 degrees, about 40 degrees, about 41 degrees, about 40 degrees, about 39 degrees, about 40 degrees, about 42 degrees, about 39 degrees and about 41 degrees, respectively. Specifically, the circumferential centers of the thin wall portions 37*a*–37*i* are arranged at irregular intervals.

In comparison to the stator 30 of the first embodiment, the circumferential centers of the thin wall portions 37*a*–37*i* of the second embodiment are circumferentially displaced from the circumferential centers of the respective bridges 36 by about −1 degree, about +1 degree, about +1 degree, about 0 degree, about 0 degree, about +1 degree, about +1 degree, about −1 degree and about 0 degree, respectively. Hereinafter, these angles will be referred to as displacement angles. The displacement angle will be defined as an angular deviation of the circumferential center of the thin wall portion 37*a*–37*i* relative to the circumferential center between corresponding two of the iron core portions 35*a*–35*i* (i.e., the circumferential center of the corresponding bridge 36). The displacement angle is determined in a predetermined circumferential direction. Thus, for example, −1 degree, which is measured in, for example, a counterclockwise direction, is the same as +359 degrees, which is measured in, for example, a clockwise direction.

Figure 9:
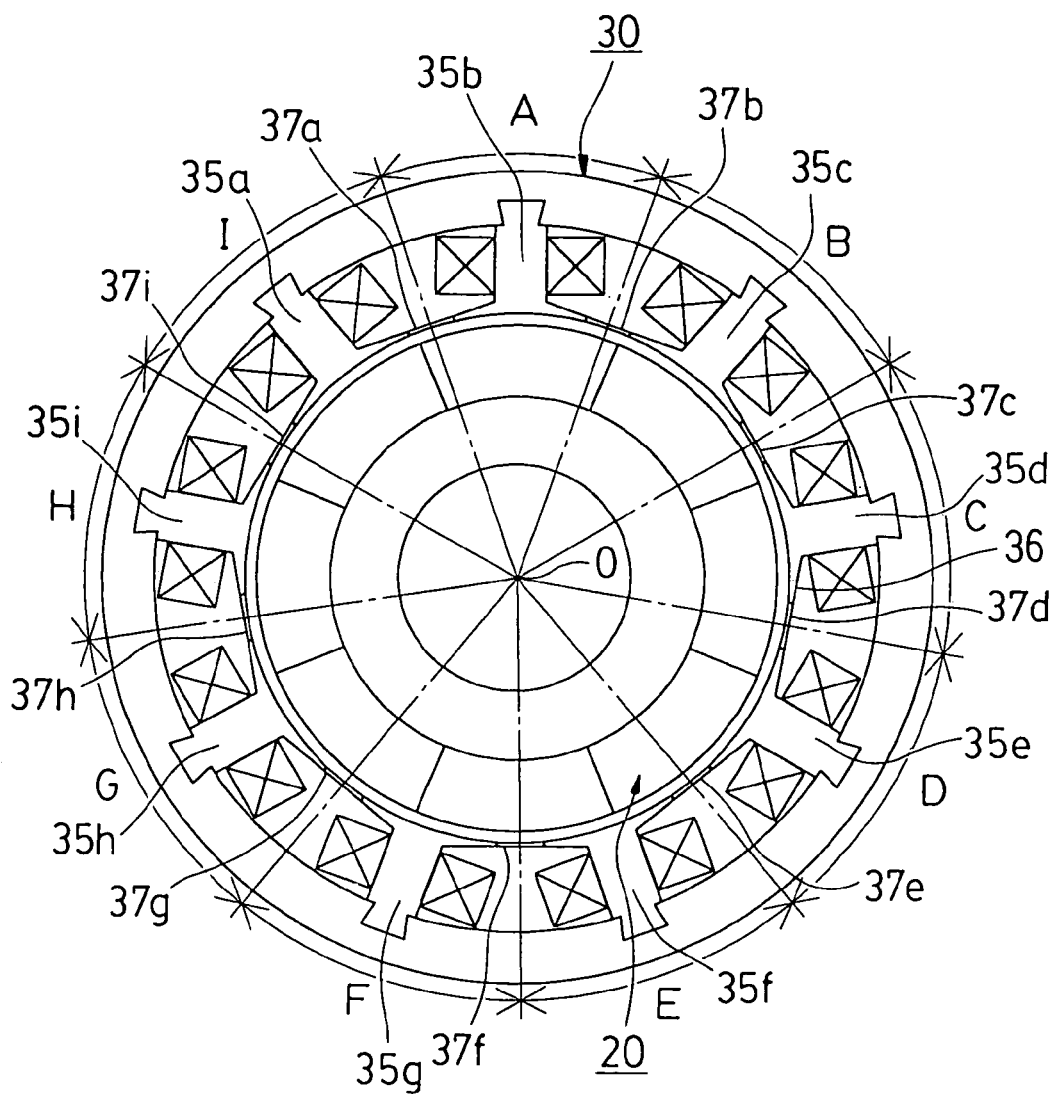
FIG. 9 is a schematic cross sectional view showing a stator and a rotor of a brushless motor according to a second embodiment of the present invention.
Figure 10:
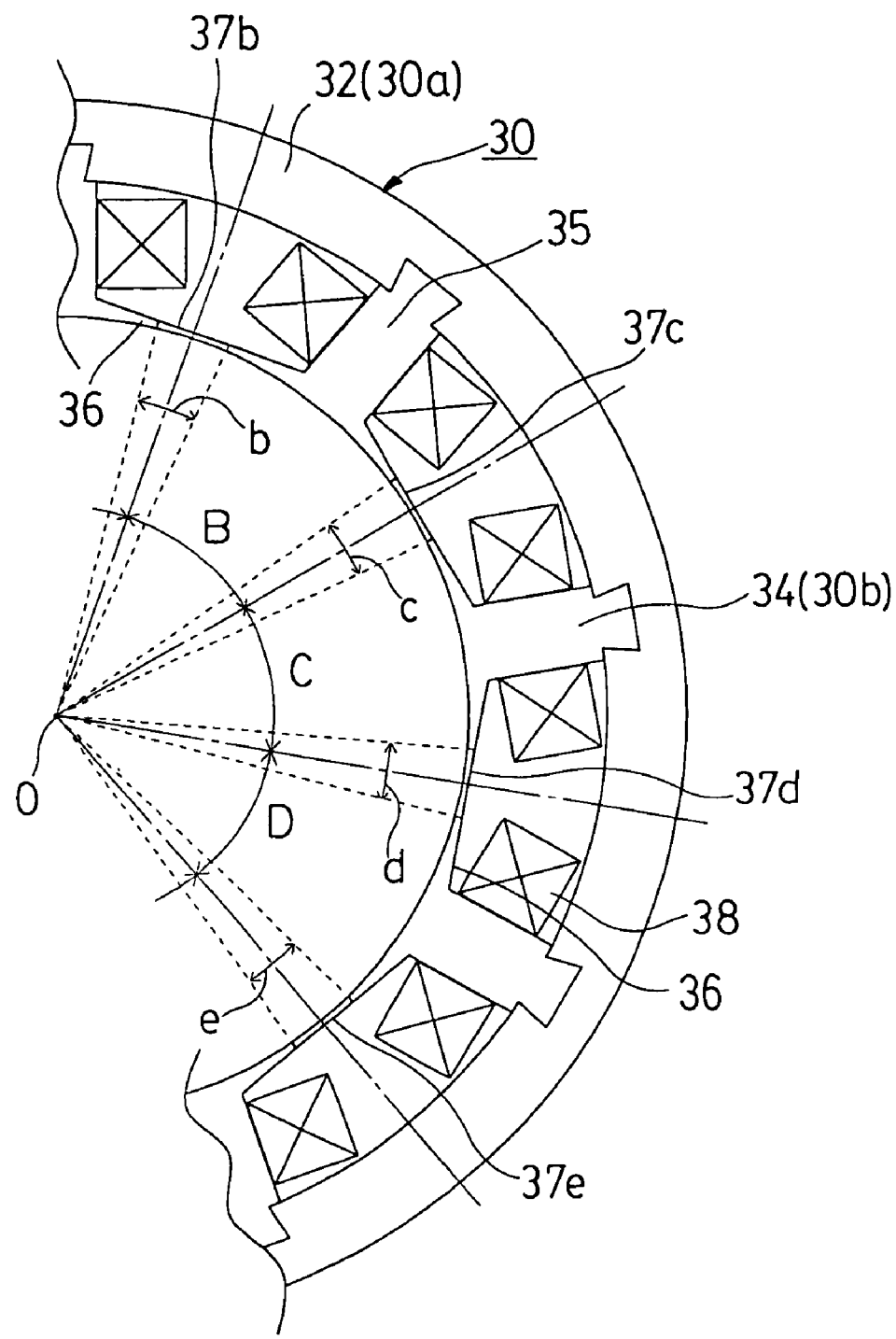
FIG. 10 is a partial enlarged cross sectional view of the stator of the second embodiment.

FIG. 10 shows a partial enlarged view of FIG. 9. As shown in FIG. 10, when the circumferential angular extents of the thin wall portions 37*b*–37*e* are indicated by angles b–e, respectively, all the angles b–e are uniform and are set to be about 10 degrees. In contrast, the angles B–D are set to be about 40 degrees, about 41 degrees and about 40 degrees, respectively, so every adjacent two of the angles B–D are not identical to one another.

The thus constructed inner core sheets 34 are axially stacked without angularly displacing the inner core sheets 34. Thus, the thin wall portions 37*a*, which have the generally identical circumferential angular extents, are axially stacked one after the other without angular displacement of the inner core sheets 34 to form the inner core 30*b*, like in the first embodiment. The other thin wall portions 37*b*–37*i* are similarly stacked. An effective magnetic flux (or output power) of the brushless motor M of the second embodiment is substantially the same as that of a brushless motor, in which the circumferential angular extents of the thin wall portions 37*a*–37*i* are uniformly set to about 10 degrees, and each thin wall portion 37*a*–37*i* is not circumferentially displaced from the circumferential center of the corresponding bridge 36.

Furthermore, in the brushless motor M of the second embodiment, each of the thin wall portions 37*a*–37*i*, each of which has the uniform circumferential angular extent, is formed at the corresponding position that is circumferentially displaced from the circumferential center of the corresponding bridge 36 by the predetermined angle. Thus, during the operation of the brushless motor M, magnetic interaction between the bridges 36 and the magnetic flux, which is generated from the magnets 26, and a rotational angle, at which the magnetic interaction takes place, differ from one bridge 36 to the next bridge 36. Thus, the torque oscillations in the cogging torque per rotation of the rotor do not show an identical change pattern, and thereby there exists a plurality of different change patterns of the torque oscillation.

As a result, even in the brushless motor M of the second embodiment, the torque oscillations in the cogging torque are spread over multiple frequency components. Thus, the number (seventy two) of torque oscillations in the cogging torque per rotation of the rotor 29 and the average size of the cogging torque are substantially the same as those of the previously proposed brushless motor. However, the noises and the vibrations, which are generated during the operation of the motor, are spread over the multiple frequency components and are thus reduced in comparison to those of the previously proposed brushless motor.

In the stator 30 of the second embodiment, all the circumferential angular extents of the thin wall portions 37a–37i are generally identical to one another. However, the present invention is not limited to this. For example, similar to the first embodiment, the circumferential angular extents of the thin wall portions 37a–37i can be irregularly set.

(Third Embodiment)

A third embodiment of the present invention will be described with reference to FIGS. 11–12. Similar to the second embodiment, components similar to those of the first embodiment will be indicated by similar numerals and will not be described further.

The rotor 20 of the third embodiment is substantially the same as the rotor 20 of the first embodiment and thus has eight magnetic poles. Similar to the stator 30 of the first embodiment, the stator 30 of the third embodiment includes nine iron core portions 35a–35i. However, unlike the stator 30 of the first embodiment, the iron core portions 35a–35i of the third embodiment are not arranged at regular intervals in the circumferential direction.

Figure 11:
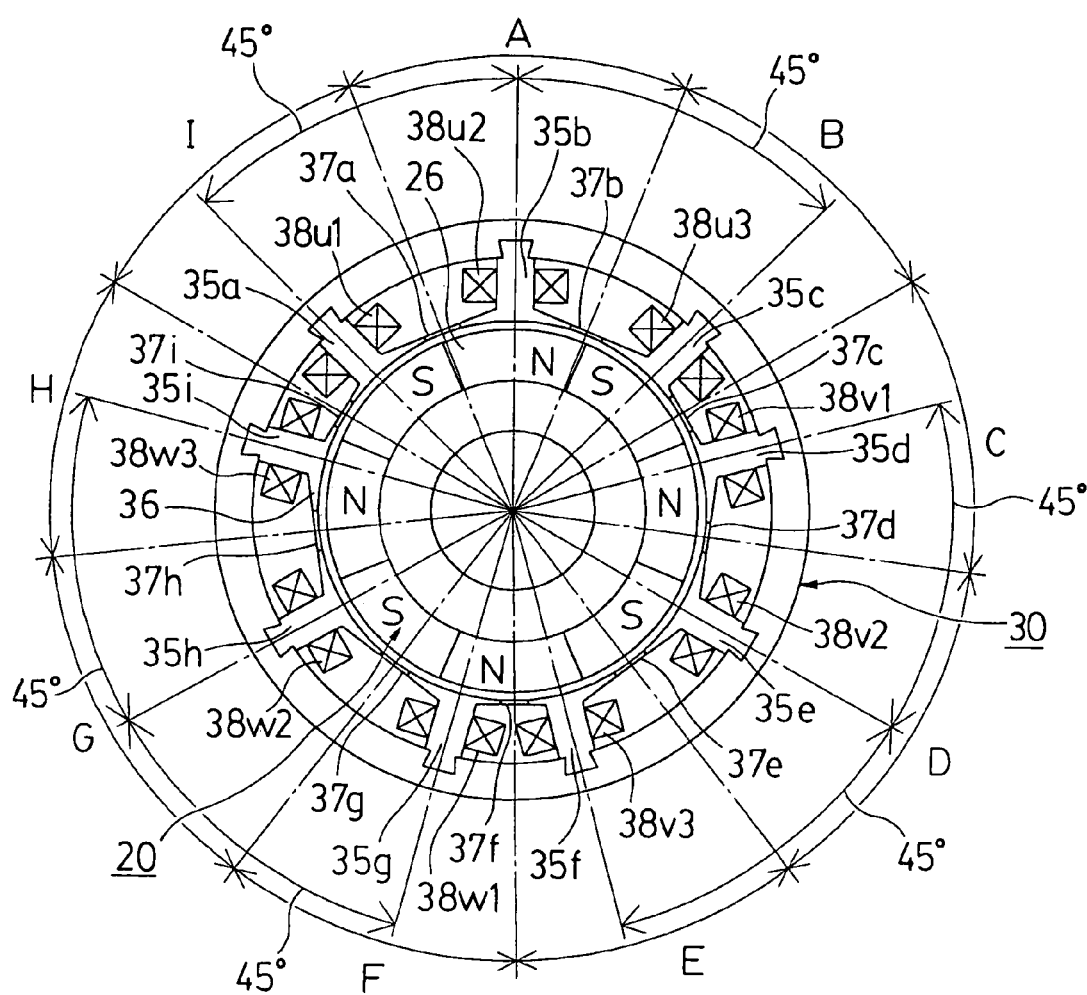
FIG. 11 is a schematic cross sectional view showing a stator and a rotor of a brushless motor according to a third embodiment.

As shown in FIG. 11, the iron core portion 35b, the iron core portion 35e and the iron core portion 35h are arranged at about 120 degree angular intervals. Furthermore, the iron core portion 35a and the iron core portion 35c are arranged on opposite sides of the iron core portion 35b and are respectively displaced from the iron core portion 35b by about 45 degrees. The iron core portion 35d and the iron core portion 35f are arranged on opposite sides of the iron core portion 35e and are respectively displaced from the iron core portion 35e by about 45 degrees. The iron core portion 35g and the iron core portion 35i are arranged on opposite sides of the iron core portion 35h and are respectively displaced from the iron core portion 35h by about 45 degrees. As described above, in the stator 30 of the third embodiment, the iron core portions 35a–35i are arranged at irregular intervals.

Because of the above arrangement, in the third embodiment, when a center of one of N-poles of the magnets 26 is placed on a center line of the iron core portion 35b in FIG. 11, centers of two of S-poles of the magnets 26 are placed on a center line of the iron core 35a and a center line of the iron core 35c, respectively. This is not only applicable to the coils 38U of the U-phase but is also equally applicable to the coils 38V of the V-phase and the coils 38W of the W-phase. The U-phase exciting current, the V-phase exciting current and the W-phase exciting current, which are phase shifted by 120 degrees one after the other, are supplied to the coils 38U of the U-phase, the coils 38V of the V-phase and the coils 38W of the W-phase, respectively.

As described above, the iron core portions 35a–35c are arranged to oppose the corresponding magnetic poles of the magnets 26. Thus, induction voltages, which are generated from the coils 38U1–38U3 of the iron core portions 35a–35c, respectively, generally coincide with each other without a phase shift therebetweeen, and thereby a conversion loss in conversion of the exciting currents into the rotating magnetic field is minimized. This is also true in the case of the iron core portions 35d–35f and in the case of the iron core portions 35g–35i. Therefore, in the brushless motor M of the third embodiment, the supplied exciting currents are effectively converted into the rotating magnetic filed, and thereby it is possible to achieve the high output power of the brushless motor M.

Furthermore, in the stator 30 of the third embodiment, the thin wall portions 37a–37i, which are formed in the corresponding bridges 36 that connect between the corresponding adjacent two of the iron core portions 35a–35i, are constructed such that all the circumferential angular extents of the thin wall portions 37a–37i differ from one another, like the stator 30 of the first embodiment.

More specifically, the circumferential angular extents of the thin wall portions 37a–37i are set to be about 11 degrees, about 10 degrees, about 12 degrees, about 9 degrees, about 11 degrees, about 8 degrees, about 10 degrees, about 12 degrees and about 9 degrees, respectively.

Furthermore, similar to the stator 30 of the second embodiment, in the stator 30 of the third embodiment, each of the thin wall portions 37a–37i is circumferentially displaced from the circumferential center of the corresponding bridge 36 by the predetermined angle.

More specifically, in FIG. 11, the angles A–I are set to be about 43 degrees, about 37.5 degrees, about 38.5 degrees, about 45 degrees, about 36.5 degrees, about 37.5 degrees, about 47 degrees, about 36.5 degrees and about 38.5 degrees, respectively. Furthermore, in a case where each of the thin wall portions 37a–37i is not circumferentially displaced from the circumferential center of the corresponding bridge 36, the angles A–I are set to be about 45 degrees, about 37.5 degrees, about 37.5 degrees, about 45 degrees, about 37.5 degrees, about 37.5 degrees, about 45 degrees, about 37.5 degrees and about 37.5 degrees, respectively.

Thus, the displacement angles of the circumferential centers of the thin wall portions 37a–37i of the third embodiment are about −1 degree, about +1 degree, about +1 degree, about 0 degree, about 0 degree, about +1 degree, about +1 degree, about −1 degree and about 0 degree, respectively.

Figure 12:
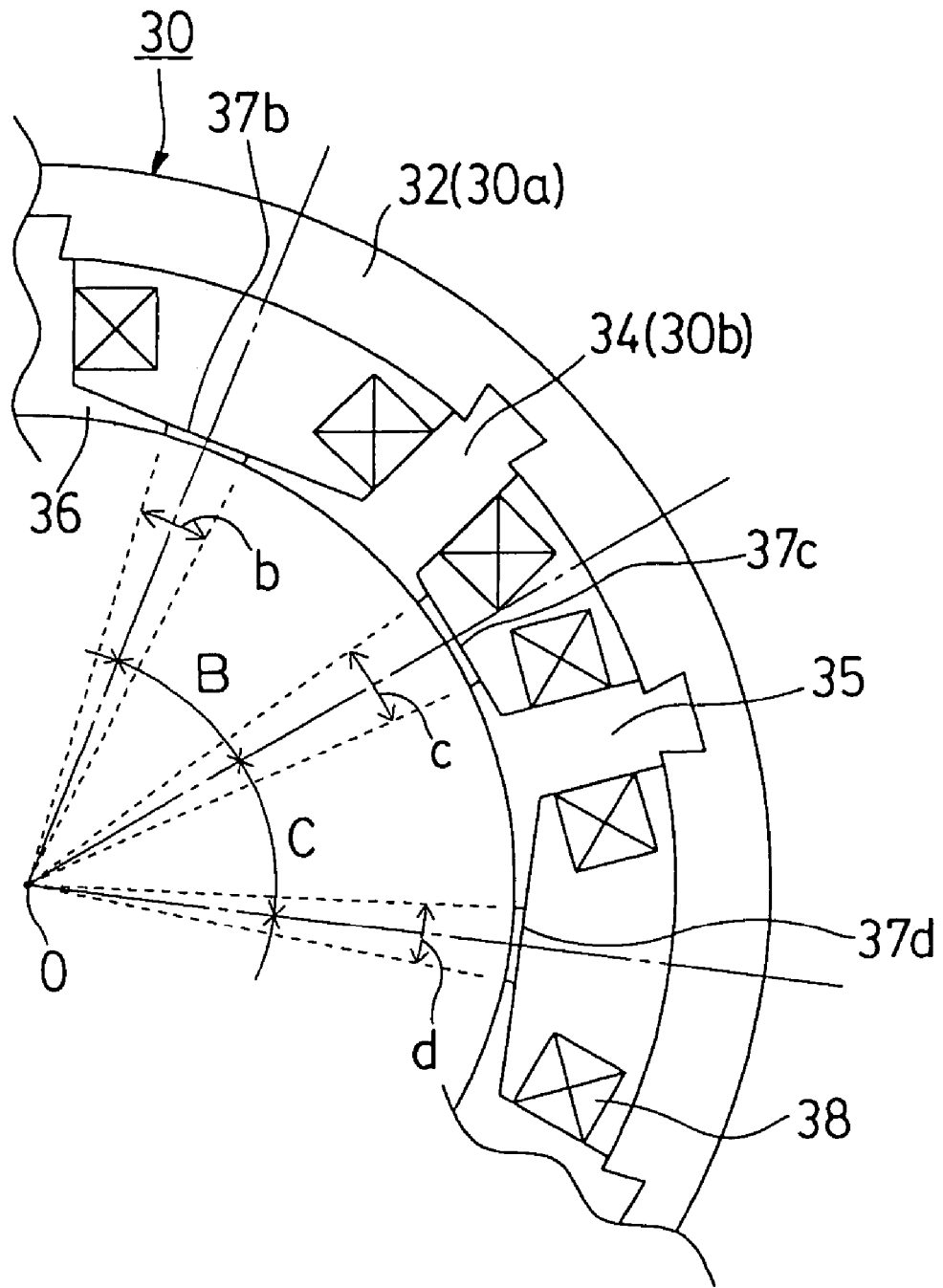
FIG. 12 is a partial enlarged schematic cross sectional view of the stator of the first embodiment.

FIG. 12 is a partial enlarged view of the FIG. 11. As shown in FIG. 12, when the circumferential angular extents of the thin wall portions 37b–37d are indicated by angles b–d, the angles b–d are set to be about 10 degrees, about 12 degrees and about 9 degrees. Furthermore, the angles B, C are set to be about 37.5 degrees and about 38.5 degrees, respectively, so that the adjacent angles B, C are not uniform.

As discussed above, in the brushless motor M of the third embodiment, the circumferential angular extents of the adjacent thin wall portions 37a–37i are not uniform, and each of the thin wall portions 37a–37i is circumferentially displaced from the circumferential center of the corresponding bridge 36 by the predetermined angle.

With this arrangement, during the operation of the brushless motor M, magnetic interaction between the bridges 36 and the magnetic flux, which is generated from the magnets 26, and a rotational angle, at which the magnetic interaction takes place, differ from one bridge 36 to the next bridge 36. Thus, the torque oscillations per rotation of the rotor 20 do not show a generally identical change pattern, and thereby there exists a plurality of different change patterns of the torque oscillation.

Thus, even in the brushless motor M of the third embodiment, the torque oscillations in the cogging torque are effectively spread over multiple frequency components. Therefore, the noises and vibrations, which are generated during the operation of the brushless motor M, are spread over the multiple frequency components and are thus reduced.

Furthermore, in the brushless motor M of the third embodiment, the iron core portions 35a–35i are not arranged at equal intervals. More specifically, the iron core portions 35*b*, 35*e*, 35*h* are arranged at about 120 degree intervals, and corresponding two of the rest of the iron core portions are arranged on the opposite sides of a corresponding one of the iron core portions 35*b*, 35*e*, 35*h* and are respectively displaced from the corresponding one of the iron core portions 35*b*, 35*e*, 35*h* by about 45 degrees. With the above arrangement, the rotating magnetic field, which is generated by the exciting currents, and the magnetic flux, which is generated from the magnets 26, are effectively used, so that the high output power of the brushless motor M can be achieved.

(Fourth Embodiment)

Figure 13:
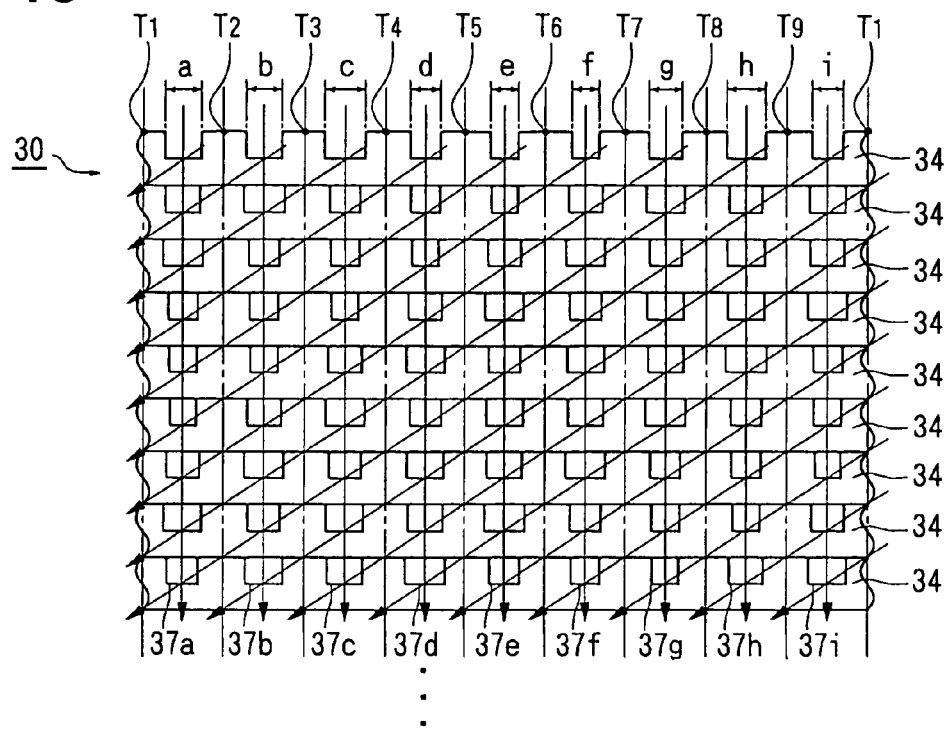
FIG. 13 is a partial schematic exploded view of a stator according to a fourth embodiment of the present invention.

Next, a fourth embodiment, which is a modification of the first embodiment, of the present invention will be described with reference to FIG. 13. In the stator 30 of the fourth embodiment, all the circumferential angular extents of the thin wall portions 37*a*–37*i* of each inner core sheet 34 differ from one another. Unlike the first embodiment, in the stator 30 of the fourth embodiment, the inner core sheets 34 are axially stacked one after the other in such a manner that the inner core sheets 34 are angularly displaced one after the other, and thus the thin wall portions 37*a*–37*i*, which have the generally identical circumferential angular extents, are not continuously stacked one after the other.

More specifically, in the present embodiment, the circumferential angular extents of the thin wall portions 37*a*–37*i* of each inner core sheet 34 are set to be about 11 degrees, about 10.5 degrees, about 12 degrees, about 9 degrees, about 8.5 degrees, about 8 degrees, about 10 degrees, about 11.5 degrees and about 9.5 degrees, respectively. An average value of the circumferential angular extents of the thin wall portions 37*a*–37*i* is about 10 degrees.

In the inner core 30*b*, the inner core sheets 34 are axially stacked in such a manner one of every axially adjacent two of the inner core sheets 34 is angularly displaced from the other one of the every axially adjacent two of the inner core sheets 34 by about 40 degrees, so that the thin wall portions 37*a*–37*i*, which have the generally identical circumferential angular extents, are not continuously axially stacked one after the other. More specifically, in the axially stacked inner core sheets 34, the angles a of the thin wall portions 37*a*, each of which is circumferentially located between the iron core portion 35*a* and the iron core portion 35*b*, are set to be about 11 degrees, about 10.5 degrees, about 12 degrees, about 9 degrees, about 8.5 degrees, about 8 degrees, about 10 degrees, about 11.5 degrees and about 9.5 degrees, respectively, from the top to bottom direction in FIG. 13. The inner core sheets 34, which have the above angles a, are repeatedly axially stacked.

In each axial column of the thin wall portions 37*a*–37*i*, which are circumferentially held between the corresponding two iron core portions 35*a*–35*i*, the circumferential angular extent of one of every axially adjacent two of the thin wall portions 37*a*–37*i* differs from the circumferential angular extent of the other of the every axially adjacent two of the thin wall portions 37*a*–37*i*.

In this embodiment, as described above, all the circumferential angular extents of the thin wall portions 37*a*–37*i* of each inner core sheets 34 differ from one another. Furthermore, the inner core sheets 34 are stacked in such a manner that the thin wall portions 37*a*–37*i*, which have the generally identical circumferential angular extents, are not stacked continuously one after the other. Thus, the noises and vibrations, which are generated during the operation of the brushless motor M, are further reduced.

In the present embodiment, each thin wall portion 37*a*–37*i* is formed in such a manner that the circumferential center of the thin wall portion 37*a*–37*i* coincides with the circumferential center between corresponding adjacent two of the iron core portions 35*a*–35*i*, i.e., coincides with the circumferential center of the corresponding bridge 36.

Even in this embodiment, similar to the stator 30 of the third embodiment, the iron core portions 35*a*–35*i* can be arranged at irregular intervals. This is also true in the following embodiments.

(Fifth Embodiment)

Figure 14:
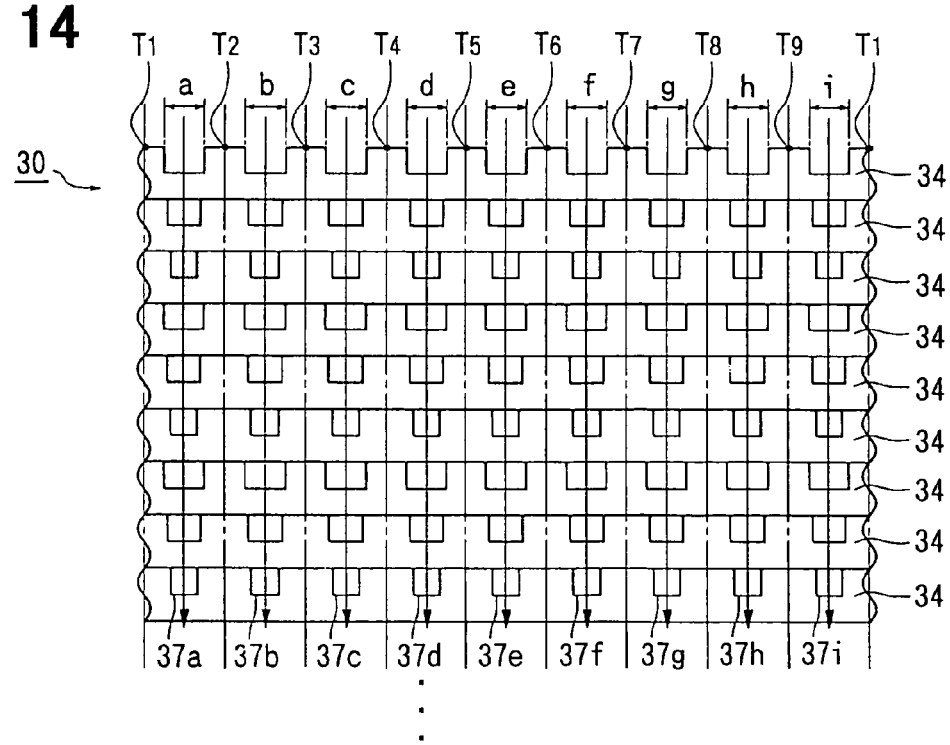
FIG. 14 is a partial schematic exploded view of a stator according to a fifth embodiment of the present invention.

A fifth embodiment of the present invention will be described with reference to FIG. 14. The stator 30 of the fifth embodiment is similar to the stator 30 of the first embodiment except the following points. That is, in the fifth embodiment, all the circumferential angular extents of the thin wall portions 37*a*–37*i* are generally identical to one another in each inner core sheet 34. Furthermore, the thin wall portions 37*a*–37*i*, which have the generally identical circumferential angular extents, are not continuously axially stacked one after the other.

More specifically, in the present embodiment, three types (first to third types) of inner core sheets 34 are provided. In the first type of the inner core sheet 34, all the circumferential angular extents of the thin wall portions 37*a*–37*i* are set to be about 12 degrees. In the second type of the inner core sheet 34, all the circumferential angular extents of the thin wall portions 37*a*–37*i* are set to be about 10 degrees. In the third type of the inner core sheet 34, all the circumferential angular extents of the thin wall portions 37*a*–37*i* are set to be about 8 degrees. That is, in the first top inner core sheet 34 located in the top of the inner core 30*b* in FIG. 14, all the angles a–i are set to be about 12 degrees. In the following second inner core sheet 34, all the angles a–i are set to be about 10 degrees. In the following third inner core sheet 34, all the angles a–i are set to be about 8 degrees. These three types of inner core sheets 34 are repeatedly axially stacked in this order to form the inner core 30*b*. Thus, the thin wall portions 37*a*–37*i*, which have the generally identical circumferential angular extents, are respectively axially placed once every predetermined number of inner core sheets 34.

Furthermore, in the above case, the inner core sheets 34 of the identical type are respectively placed once every other two core sheets 34. Alternatively, four types of inner core sheets 34 may be provided, and the inner core sheets 34 of the identical type may be respectively placed once every other three inner core sheets 34. Further alternatively, five types of inner core sheets 34 may be provided, and the inner core sheets 34 of the identical type may be placed once every other four inner core sheets 34. Further alternatively, multiple types of inner core sheets 34 may be provided and may be axially stacked one after the other with an irregular order.

As discussed above, in the present embodiment, the inner core sheets 34 are axially stacked in such a manner that the thin wall portions 37*a*–37*i*, which have the generally identical circumferential angular extents, are not continuously axially stacked one after the other. More specifically, the inner core sheets 34 are axially stacked such that each of the angles a–i of the thin wall portions 37*a*–37*i* axially changes as about 12 degrees, about 10 degrees, about 8 degrees, about 12 degrees, about 10 degrees, about 8 degrees and so on.

In this embodiment, as described above, the inner core sheets 34 are axially stacked in such a manner that the thin wall portions 37*a*–37*i*, which have the generally identical circumferential angular extents, are not continuously axially stacked one after the other. Thus, the noises and vibrations, which are generated during the operation of the brushless motor M, are reduced.

In the present embodiment, each thin wall portion 37a–37i is formed in such a manner that the circumferential center of the thin wall portion 37a–37i coincides with the circumferential center between corresponding adjacent two of the iron core portions 35a–35i, i.e., coincides with the circumferential center of the corresponding bridge 36.

(Sixth Embodiment)

Figure 15:
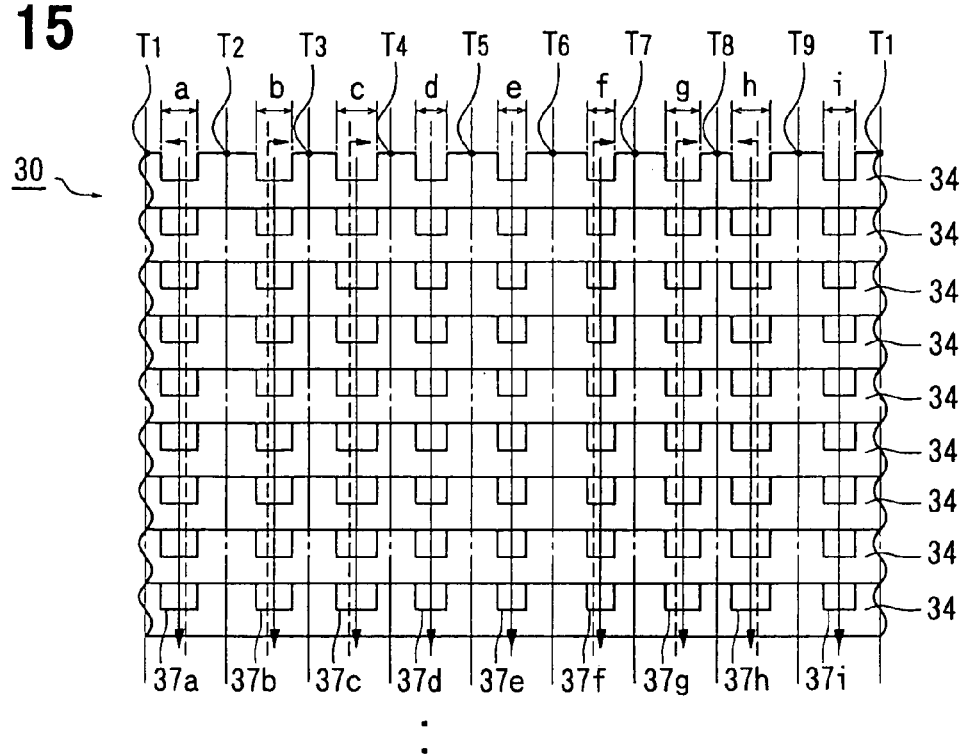
FIG. 15 is a partial schematic exploded view of a stator according to a sixth embodiment of the present invention.

Next, a sixth embodiment, which is a modification of the first and second embodiments, of the present invention will be described with reference to FIG. 15. In the stator 30 of the sixth embodiment, similar to the first embodiment, all the circumferential angular extents of the thin wall portions 37a–37i of each inner core sheet 34 differ from one another. Furthermore, similar to the second embodiment, each thin wall portion 37a–37i is formed in a predetermined position, which is circumferentially displaced from a circumferential center between corresponding two of the iron core portions 35a–35i (i.e., a circumferential center of the corresponding bridge 36) by a predetermined angle.

More specifically, in the present embodiment, the circumferential angular extents of the thin wall portions 37a–37i of each inner core sheet 34 are set to be about 11 degrees, about 10.5 degrees, about 12 degrees, about 9 degrees, about 8.5 degrees, about 8 degrees, about 10 degrees, about 11.5 degrees and about 9.5 degrees, respectively. An average value of the circumferential angular extents of the thin wall portions 37a–37i is about 10 degrees. Furthermore, the displacement angles of the circumferential centers of the thin wall portions 37a–37i of the sixth embodiment are about –1 degree, about +1 degree, about +1 degree, about 0 degree, about 0 degree, about +1 degree, about +1 degree, about –1 degree and about 0 degree, respectively. In FIG. 15, each axial dotted line with an arrow indicates the circumferential center of the corresponding bridge 36, and a solid line with an arrow indicates the circumferential center of the corresponding thin wall portion 37a–37i. The displacement angles of the circumferential center of the thin wall portions 37a–37i are not limited to the above ones and can be selected at random in the circumferential direction.

In the inner core 30b, the inner core sheets 34 are axially stacked one after the other without angular displacement of the inner core sheets 34. More specifically, the inner core sheets 34 are axially stacked in such a manner that the thin wall portions 37a–37i, which have the generally identical circumferential angular extents, are continuously axially stacked one after the other at the corresponding predetermined angular position. Furthermore, the thin wall portions 37a–37i, which have the generally identical displacement angles, are continuously axially stacked one after the other.

In the present embodiment, as discussed above, all the circumferential angular extents of the thin wall portions 37a–37i of each inner core sheet 34 differ from one another, and each thin wall portion 37a–37i is formed in a predetermined position, which is circumferentially displaced from the circumferential center of the corresponding bridge 36 by the predetermined angle. In this way, the noises and vibrations, which are generated during the operation of the brushless motor M, are reduced.

(Seventh Embodiment)

Figure 16:
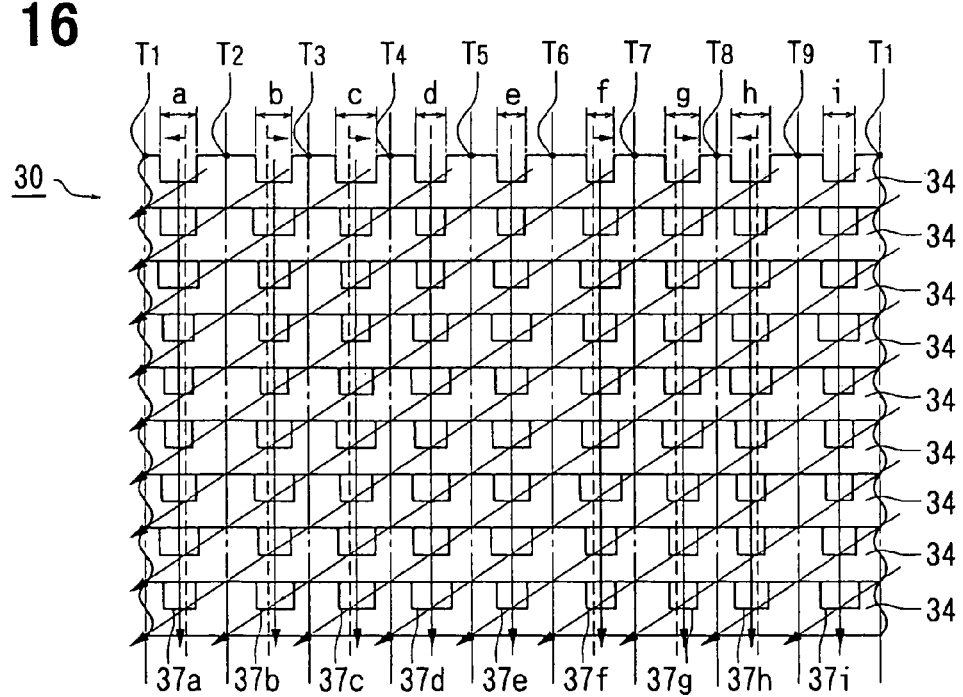
FIG. 16 is a partial schematic exploded view of a stator according to a seventh embodiment of the present invention.

A seventh embodiment, which is a modification of the fourth embodiment and the second embodiment, of the present invention will be described with reference to FIG. 16. In the stator 30 of the seventh embodiment, similar to the fourth embodiment, all the circumferential angular extents of the thin wall portions 37a–37i of each inner core sheet 34 differ from one another, and the thin wall portions 37a–37i, which have the generally identical circumferential angular extents, are not continuously axially stacked one after the other. Furthermore, similar to the second embodiment, each thin wall portion 37a–37i is formed in a predetermined position, which is circumferentially displaced from the circumferential center between corresponding two of the iron core portions 35a–35i (i.e., the circumferential center of the corresponding bridge 36) by a predetermined angle.

More specifically, in the present embodiment, the circumferential angular extents of the thin wall portions 37a–37i of each inner core sheet 34 are set to be about 11 degrees, about 10.5 degrees, about 12 degrees, about 9 degrees, about 8.5 degrees, about 8 degrees, about 10 degrees, about 11.5 degrees and about 9.5 degrees, respectively. The thin wall portions 37a–37i, which have the generally identical circumferential angular extents, are not continuously axially stacked one after the other. Furthermore, the displacement angles of the circumferential centers of the thin wall portions 37a–37i of the seventh embodiment are about –1 degree, about +1 degree, about +1 degree, about 0 degree, about 0 degree, about +1 degree, about +1 degree, about –1 degree and about 0 degree, respectively. Furthermore, the thin wall portions 37a–37i, which have the generally identical displacement angles, are continuously axially stacked one after the other.

In this embodiment, as discussed above, all the circumferential angular extents of the thin wall portions 37a–37i of each inner core sheet 34 differ from one another, and the thin wall portions 37a–37i, which have the generally identical circumferential angular extents, are not continuously axially stacked one after the other. Furthermore, each thin wall portion 37a–37i is circumferentially displaced from the circumferential center of the corresponding bridge 36 by the predetermined angle. Thus, the noises and vibrations, which are generated during the operation of the brushless motor M, are further reduced.

(Eighth Embodiment)

Figure 17:
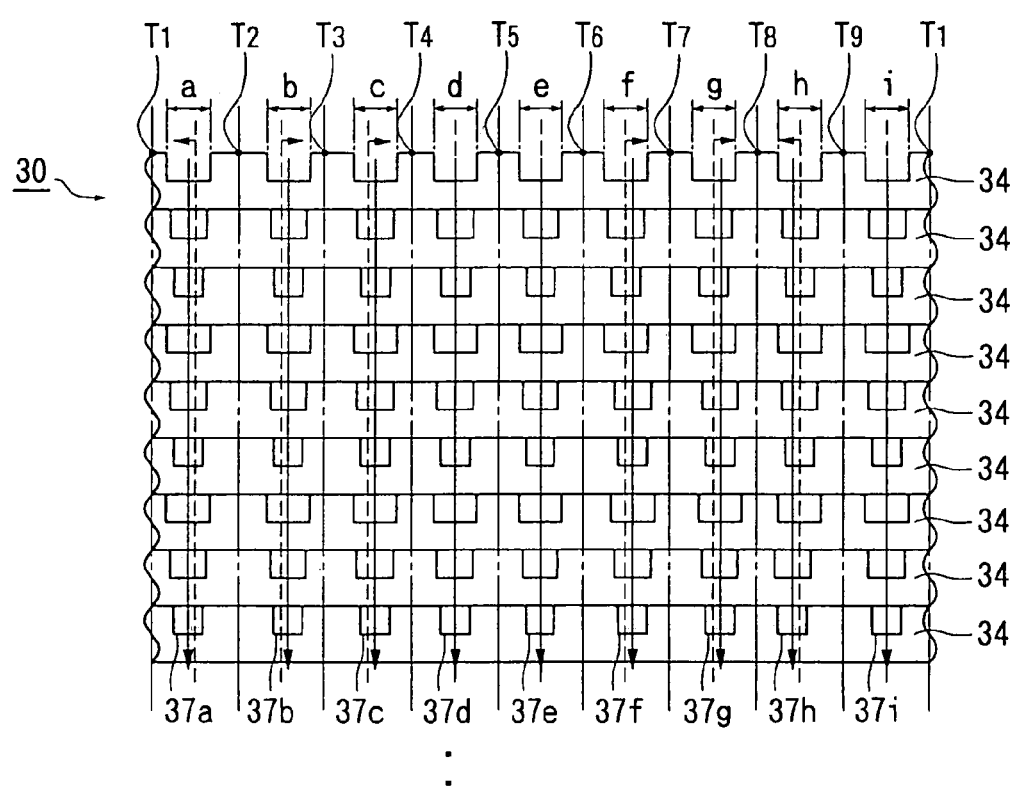
FIG. 17 is a partial schematic exploded view of a stator according to an eighth embodiment of the present invention.

An eighth embodiment, which is a modification of the fifth embodiment and the second embodiment, of the present invention will be described with reference to FIG. 17. Similar to the fifth embodiment, the stator 30 of the eighth embodiment are formed in such a manner that the thin wall portions 37a–37i, which have the generally identical circumferential angular extents, are not continuously axially stacked one after the other. Furthermore, similar to the second embodiment, each thin wall portion 37a–37i is formed in a predetermined position, which is circumferentially displaced from the circumferential center between corresponding two of the iron core portions 35a–35i (i.e., the circumferential center of the corresponding bridge 36) by a predetermined angle.

More specifically, in the present embodiment, three types (first to third types) of inner core sheets 34 are repeatedly axially stacked one after the other. In the first type of inner core sheet 34, the displacement angle of the circumferential center of each of the thin wall portions 37a–37i is set to be about 12 degrees. In the second type of inner core sheet 34, the displacement angle of the circumferential center of each of the thin wall portions 37a–37i is set to be about 10 degrees. In the third type of inner core sheet 34, the displacement angle of the circumferential center of each of the thin wall portions 37a–37i is set to be about 8 degrees.

Thus, the thin wall portions 37a–37i, which have the generally identical circumferential angular extents, are respectively axially placed once every predetermined number of inner core sheets 34. Furthermore, the displacement angles of the circumferential centers of the thin wall portions 37a–37i of the eighth embodiment are about −1 degree, about +1 degree, about +1 degree, about 0 degree, about 0 degree, about +1 degree, about +1 degree, about −1 degree and about 0 degree, respectively. Also, the thin wall portions 37a–37i, which have the generally identical circumferential angular extents, are continuously axially stacked one after the other at the corresponding predetermined angular position.

As described above, the thin wall portions 37a–37i, which have the generally identical circumferential angular extents, are not continuously axially stacked one after the other. Furthermore, each thin wall portion 37a–37i is formed in the predetermined position, which is circumferentially displaced from the circumferential center of the corresponding bridge 36 by the predetermined angle. Thus, the noises and vibrations, which are generated during the operation of the brushless motor M, are reduced.

(Ninth Embodiment)

Figure 18A:
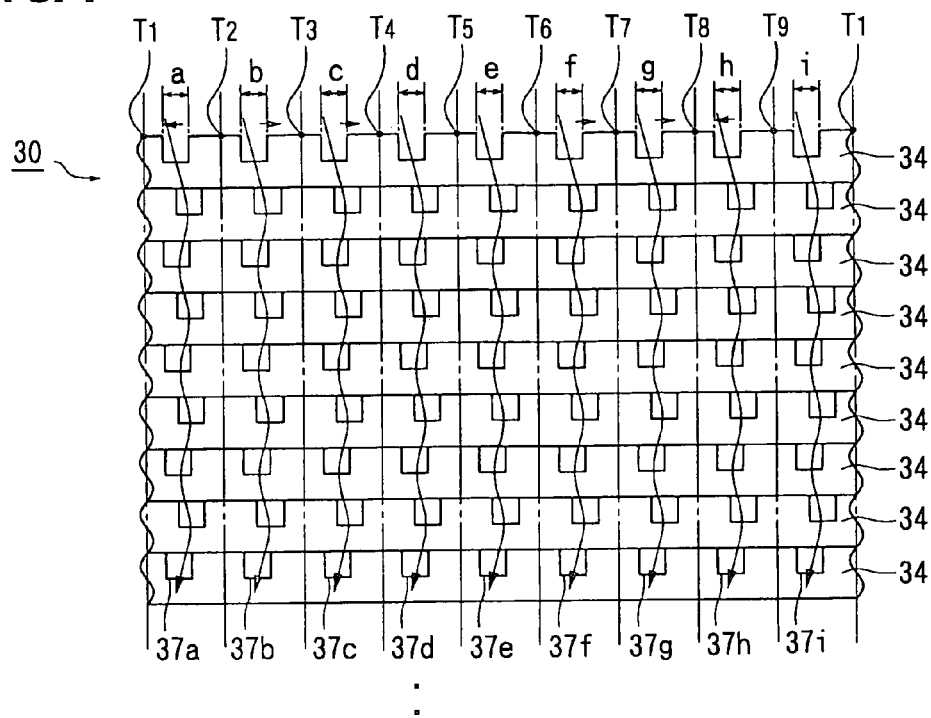
FIG. 18A is a partial schematic exploded view of a stator according to an ninth embodiment of the present invention.

A ninth embodiment, which is a modification of the second embodiment, of the present invention will be described with reference to FIG. 18A. In the stator 30 of the ninth embodiment, similar to the second embodiment, each thin wall portion 37a–37i is formed in a predetermined position, which is circumferentially displaced from the circumferential center between corresponding two of the iron core portions 35a–35i (i.e., the circumferential center of the corresponding bridge 36) by a predetermined angle.

However, in the present embodiment, unlike the second embodiment, the displacement angles of the thin wall portions, which are axially stacked one after the other, are not uniform.

More specifically, in the present embodiment, all the circumferential angular extents of the thin wall portions 37a–37i are set to be about 8 degrees. Furthermore, in the inner core 30b of the present embodiment, two types of inner core sheets 34 are alternately axially stacked. In one of the two types of inner core sheets 34, the circumferential center of the thin wall portion 37a–37i of each bridge 36 is circumferentially displaced from the circumferential center of the bridge 36 by about +2 degrees. In the other one of the two types of inner core sheets 34, the circumferential center of the thin wall portion 37a–37i of each bridge 36 is circumferentially displaced from the circumferential center of the bridge 36 by about −2 degrees. With this arrangement, in the stator 30, the thin wall portions 37a–37i are skewed at every other inner core sheet 34. A skew period is every two inner core sheets 34. Thus, the thin wall portions 37a–37i, which have the generally identical displacement angles, are respectively axially placed once every other inner core sheet 34.

Figure 18B:
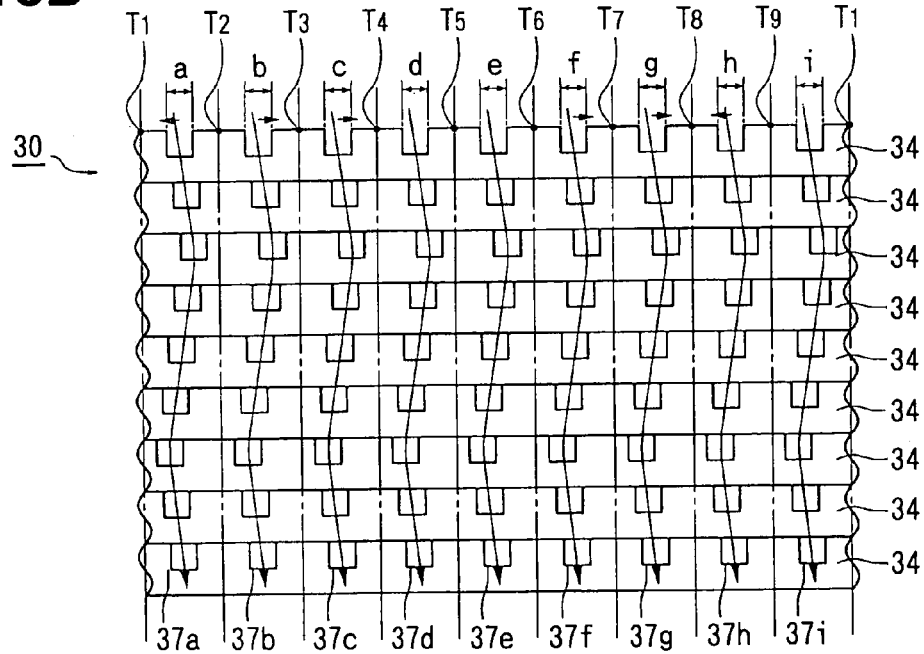
FIG. 18B is a partial schematic exploded view of another stator of the ninth embodiment.

Furthermore, as shown in FIG. 18B, five types (first to fifth types) of inner core sheets 34 can be used to form the inner core 30b. In the first type of inner core sheet 34, the displacement angle of the circumferential center of each of the thin wall portions 37a–37i is set to be about −2 degrees. In the second type of inner core sheet 34, the displacement angle of the circumferential center of each of the thin wall portions 37a–37i is set to be about −1 degrees. In the third type of inner core sheet 34, the displacement angle of the circumferential center of each of the thin wall portions 37a–37i is set to be about 0 degree. In the fourth type of inner core sheet 34, the displacement angle of the circumferential center of each of the thin wall portions 37a–37i is set to be about +1 degree. In the fifth type of inner core sheet 34, the displacement angle of the circumferential center of each of the thin wall portions 37a–37i is set to be about +2 degrees.

The five types of the inner core sheets 34 can be axially stacked in any appropriate order to form the inner core 30b. For example, in order to gradually skew the thin wall portions 37a–37i in the axial direction, the third type of inner core sheet (with the displacement angle of about 0 degree), the fourth type of inner core sheet (with the displacement angle of about +1 degree), the fifth type of inner core sheet (with displacement angle of about +2 degrees), the fourth type of inner core sheet (with the displacement angle of about +1 degree), the third type of inner core sheet (with the displacement angle of about 0 degree), the second type of inner core sheet (with the displacement angle of about −1 degree), the first type of inner core sheet (with the displacement angle of about −2 degrees) and the second type of inner core sheet (with the displacement angle of about −1 degree) can be repeatedly axially stacked in this order, as shown in FIG. 18B. With this arrangement, a skew period of the thin wall portions 37a–37i can be lengthened. In this case, the skew period is every eight inner core sheets 34. Thus, the thin wall portions 37a–37i, which have the generally identical displacement angles, are respectively axially placed once every eight inner core sheets 34.

In the present embodiment, as described above, each thin wall portion 37a–37i is formed at the corresponding position that is circumferentially displaced from the circumferential center of the corresponding bridge 36 by the predetermined angle. Furthermore, the thin wall portions 37a–37i, which have the generally identical displacement angles, are not continuously axially stacked one after the other between the corresponding iron core portions 35. Therefore, the noises and the vibrations, which are generated during the operation of the brushless motor M, are reduced.

(Tenth Embodiment)

A tenth embodiment, which is a modification of the ninth embodiment, will be described with reference to FIG. 19A. In the present embodiment, the stator 30, which has six iron core portions (even number of iron core portions) 35a–35i, will be used as an exemplary stator although the present embodiment is not limited to this. In the stator 30 of the tenth embodiment, similar to the ninth embodiment, each thin wall portion 37a–37i is formed at a corresponding position that is circumferentially displaced from the circumferential center between corresponding adjacent two of the iron core portions 35a–35i (i.e., the circumferential center of the corresponding bridge 36) by a predetermined angle.

However, in the present embodiment, unlike the ninth embodiment, the displacement angles of the thin wall portions 37a–37i are not uniform in each inner core sheet 34. In this instance, for the sake of clarity, the inner core sheets 34 shown in FIG. 19A are incrementally numbered from the top to the bottom in the vertical direction in FIG. 19A. In such a case, in each of the odd-numbered inner core sheets 34, the displacement angle of the circumferential center of each of the thin wall portions 37a, 37c, 37e is about −2 degrees, and the displacement angle of the circumferential center of each of the thin wall portions 37b, 37d, 37f is about +2 degrees. By contrast, in each of the even-numbered inner core sheets 34, the displacement angle of the circumferential center of each of the thin wall portions 37a, 37c, 37e is about +2 degrees, and the displacement angle of the circumferential center of each of the thin wall portions 37b, 37d, 37f is about −2 degrees.

Figure 19A:
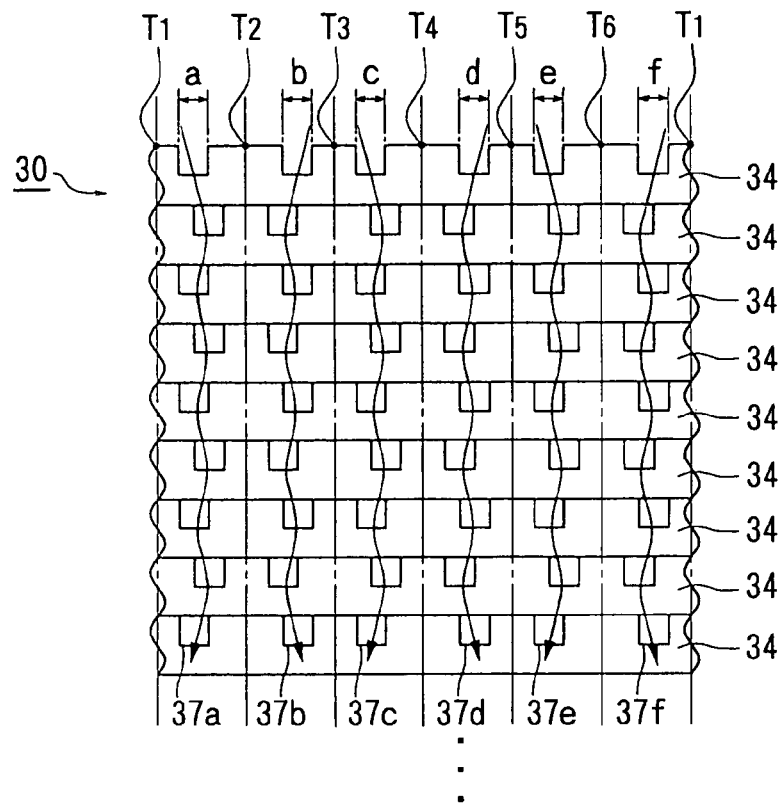
FIG. 19A is a partial schematic exploded view of a stator according to a tenth embodiment of the present invention.

Thus, when the odd-numbered inner core sheets 34 and the even-numbered inner core sheets 34 are alternately axially stacked, the thin wall portions 37a–37i are skewed from one inner core sheet 34 to the next inner core sheet 34 between corresponding two iron core portions 35a–35i, as shown in FIG. 19A. At this time, the skew period is every two inner core sheets 34. A phase difference between circumferentially adjacent two imaginary skew lines indicated by solid lines in FIG. 19A is about 180 degrees.

In this instance, unlike the ninth embodiment, the circumferential angular space between the circumferential centers of any two circumferentially adjacent thin wall portions 37a–37i is not uniform and periodically increases and decreases.

Figure 19B:
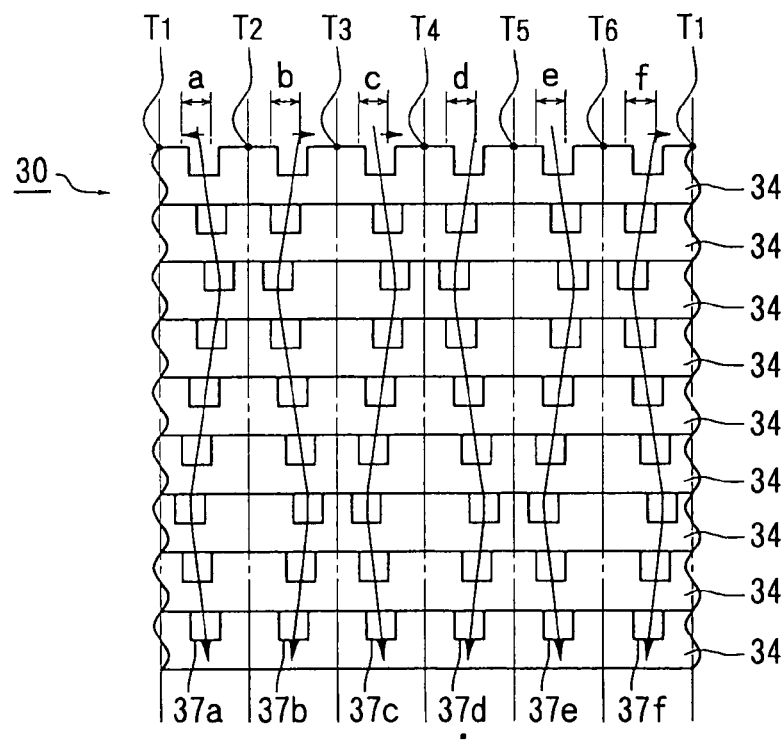
FIG. 19B is a partial schematic exploded view of another stator of the tenth embodiment.

Alternative to stator 30 of FIG. 19A, five types of inner core sheets 34 can be axially stacked to form the stator 30, as shown in FIG. 19B. More specifically, in this instance, in the first top inner core sheet 34 located in the top of the inner core 30b in FIG. 19B, the displacement angle of the circumferential center of each of the thin wall portions 37a–37f is about 0 degree. In the following second inner core sheet 34, the displacement angle of the circumferential center of each of the thin wall portions 37a, 37c, 37e is about +1 degree, and the displacement angle of the circumferential center of each of the thin wall portions 37b, 37d, 37f is about −1 degree. In the following third inner core sheet 34, the displacement angle of the circumferential center of each of the thin wall portions 37a, 37c, 37e is about +2 degrees, and the displacement angle of the circumferential center of each of the thin wall portions 37b, 37d, 37f is about −2 degrees. In the following fourth inner core sheet 34, similar to the second inner core sheet 34, the displacement angle of the circumferential center of each of the thin wall portions 37a, 37c, 37e is about +1 degree, and the displacement angle of the circumferential center of each of the thin wall portions 37b, 37d, 37f is about −1 degree. In the following fifth inner core sheet 34, similar to the first inner core sheet 34, the displacement angle of the circumferential center of each of the thin wall portions 37a–37f is about 0 degree. In the following sixth inner core sheet 34, the displacement angle of the circumferential center of each of the thin wall portions 37a, 37c, 37e is about −1 degree, and the displacement angle of the circumferential center of each of the thin wall portions 37b, 37d, 37f is about +1 degree. In the following seventh inner core sheet 34, the displacement angle of the circumferential center of each of the thin wall portions 37a, 37c, 37e is about −2 degrees, and the displacement angle of the circumferential center of each of the thin wall portions 37b, 37d, 37f is about +2 degrees. In the following eighth inner core sheet 34, similar to the sixth inner core sheet 34, the displacement angle of the circumferential center of each of the thin wall portions 37a, 37c, 37e is about −1 degree, and the displacement angle of the circumferential center of each of the thin wall portions 37b, 37d, 37f is about +1 degree. In the following ninth inner core sheet 34, similar to the first inner core sheet 34, the displacement angle of the circumferential center of each of the thin wall portions 37a–37f is about 0 degree. The above first to ninth inner core sheets 34 are repeatedly axially stacked in this order. With this arrangement, the skew period of the thin wall portions 37a–37i can be increased. In this instance, the skew period is every eight inner core sheets. In the case of FIG. 19A, the thin wall portions 37a–37i, which have the generally identical displacement angles, are respectively axially placed once every two inner core sheets 34. In the case of FIG. 19B, the thin wall portions 37a–37i, which have the generally identical displacement angles, are respectively axially placed once every eight inner core sheets 34, respectively.

As discussed above, in the present embodiment, each thin wall portion 37a–37i is formed in the predetermined position, which is circumferentially displaced from the circumferential center of the corresponding bridge 36 by the predetermined angle. Furthermore, the thin wall portions 37a–37i, which have the generally identical displacement angles, are not continuously axially stacked one after the other between the corresponding iron core portions 35a–35i. Thus, the noises and the vibrations, which are generated during the operation of the brushless motor M, are reduced.

(Eleventh Embodiment)

Figure 20:
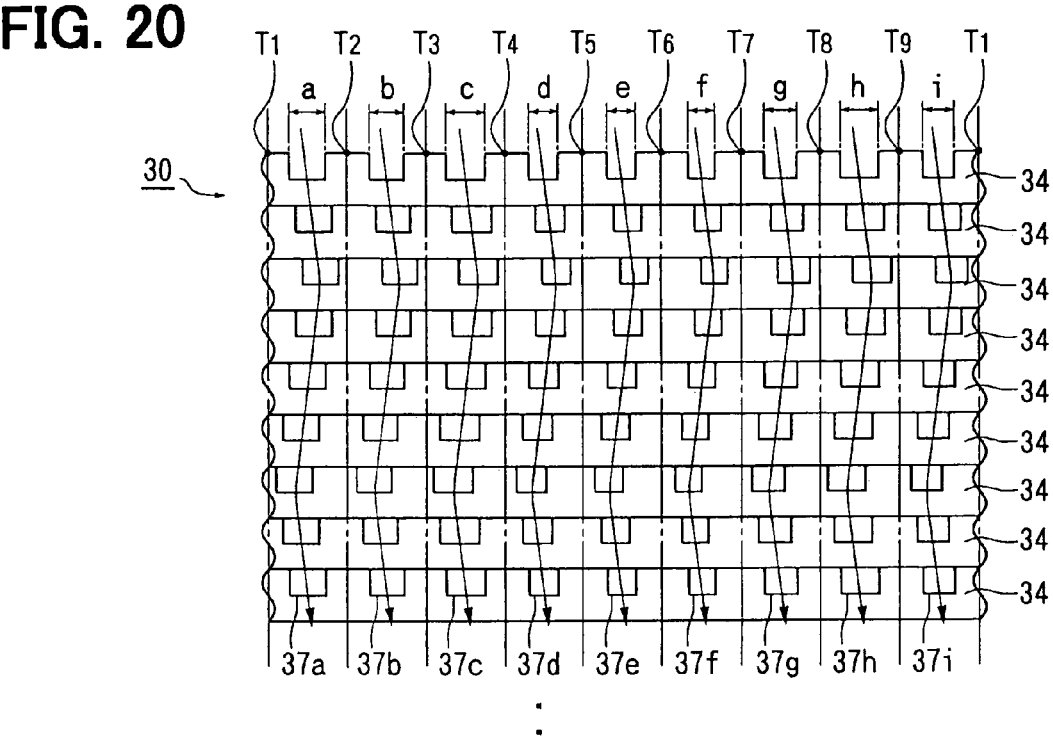
FIG. 20 is a partial schematic exploded view of a stator according to an eleventh embodiment of the present invention.

Next, an eleventh embodiment, which is a modification of the first embodiment and the ninth embodiment, will be described with reference to FIG. 20. In the stator 30 of the eleventh embodiment, similar to the first embodiment, all the circumferential angular extents of the thin wall portions 37a–37i of each inner core sheet 34 differ from one another. Furthermore, similar to the ninth embodiment, each thin wall portion 37a–37i is formed in a predetermined position, which is circumferentially displaced from the circumferential center of the corresponding bridge 36 by a predetermined angle. Furthermore, the thin wall portions 37a–37i, which have the generally identical displacement angles, are not continuously axially stacked one after the other.

Specifically, the circumferential angular extents of the thin wall portions 37a–37i are set to be about 11 degrees, about 10.5 degrees, about 12 degrees, about 9 degrees, about 8.5 degrees, about 8 degrees, about 10 degrees, about 11.5 degrees and about 9.5 degrees, respectively, in each inner core sheet 34.

Five types (first to fifth types) of inner core sheets 34 can be used to form the inner core 30b. In the first type of inner core sheet 34, the displacement angle of the circumferential center of each of the thin wall portions 37a–37i is set to be about −2 degrees. In the second type of inner core sheet 34, the displacement angle of the circumferential center of each of the thin wall portions 37a–37i is set to be about −1 degree. In the third type of inner core sheet 34, the displacement angle of the circumferential center of each of the thin wall portions 37a–37i is set to be about 0 degree. In the fourth type of inner core sheet 34, the displacement angle of the circumferential center of each of the thin wall portions 37a–37i is set to be about +1 degree. In the fifth type of inner core sheet 34, the displacement angle of the circumferential center of each of the thin wall portions 37a–37i is set to be about +2 degrees. The five types of inner core sheets 34 are stacked in such a manner that the thin wall portions 37a–37i, which have the generally identical displacement angles, are not continuously stacked one after the other between corresponding iron core portions 35a–35i. In the stator 30 of the present instance, the displacement angle of the thin wall portions 37a–37i periodically changes every eight inner core sheets 34. That is, the skew period is every eight inner core sheets. Thus, the thin wall portions 37a–37i, which have the generally identical displacement angles, are respectively axially placed once every eight inner core sheets 34.

As described above, in the present embodiment, all the circumferential angular extents of the thin wall portions 37a–37i of each inner core sheet 34 differ from one another, and each thin wall portion 37a–37i is formed in the predetermined position, which is circumferentially displaced from the circumferential center of the corresponding bridge 36 by the predetermined angle. Furthermore, the thin wall portions 37a–37i, which have the generally identical displacement angles, are not continuously axially stacked one after the other between the corresponding iron core portions 35a–35i. Thus, the noises and the vibrations, which are generated during the operation of the brushless motor M, are reduced.

(Twelfth Embodiment)

Figure 21:
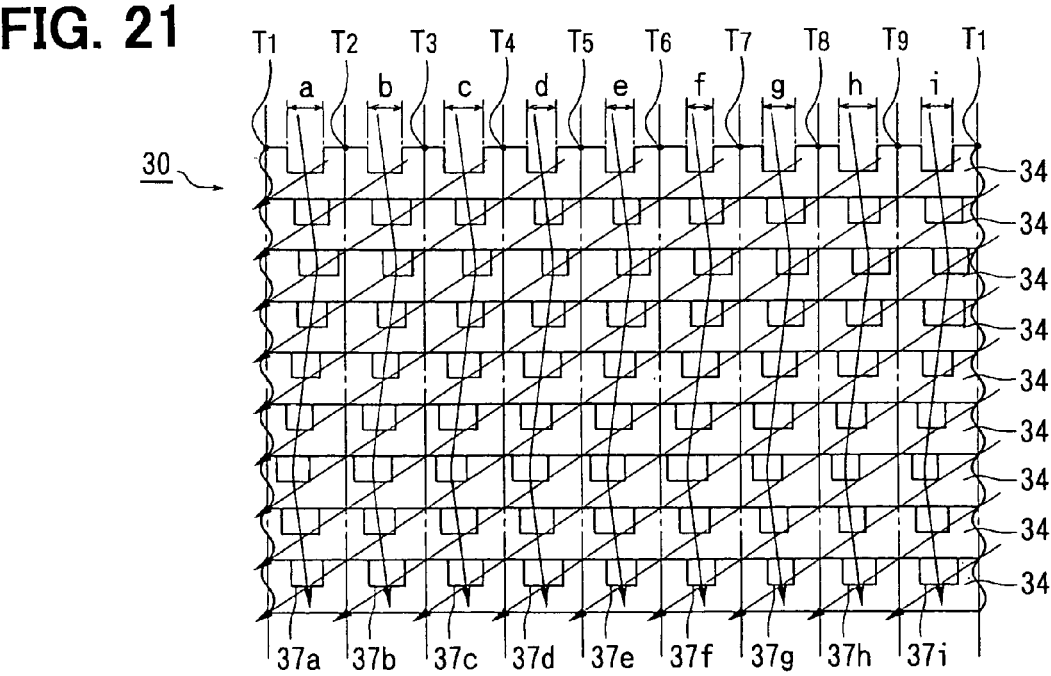
FIG. 21 is a partial schematic exploded view of a stator according to a twelfth embodiment of the present invention.

Next, a twelfth embodiment, which is a modification of the fourth embodiment and the ninth embodiment, of the present invention will be described with reference to FIG. 21. In the stator 30 of the twelfth embodiment, similar to the fourth embodiment, all the circumferential Angular extents of the thin wall portions 37a–37i of each inner core sheet 34 differ from one another. Furthermore, the inner core sheets 34 are stacked in such a manner that the thin wall portions 37a–37i, which have the generally identical circumferential angular extents, are not continuously axially stacked one after the other. Furthermore, similar to the ninth embodiment, each thin wall portion 37a–37i is circumferentially displaced from the circumferential center of the corresponding bridge 36 by the predetermined angle. Also, the thin wall portions 37a–37i, which have the generally identical displacement angles, are not continuously axially stacked one after the other.

Specifically, the circumferential angular extents of the thin wall portions 37a–37i are set to be about 11 degrees, about 10.5 degrees, about 12 degrees, about 9 degrees, about 8.5 degrees, about 8 degrees, about 10 degrees, about 11.5 degrees and about 9.5 degrees, respectively, in each inner core sheet 34.

Five types (first to fifth types) of inner core sheets 34 can be used to form the inner core 30b. In the first type of inner core sheet 34, the displacement angle of the circumferential center of each of the thin wall portions 37a–37i is set to be about −2 degrees. In the second type of inner core sheet 34, the displacement angle of the circumferential center of each of the thin wall portions 37a–37i is set to be about −1 degree. In the third type of inner core sheet 34, the displacement angle of the circumferential center of each of the thin wall portions 37a–37i is set to be about 0 degree. In the fourth type of inner core sheet 34, the displacement angle of the circumferential center of each of the thin wall portions 37a–37i is set to be about +1 degree. In the fifth type of inner core sheet 34, the displacement angle of the circumferential center of each of the thin wall portions 37a–37i is set to be about +2 degrees. The five types of inner core sheets 34 are stacked and are angularly displaced one after the other by about 40 degrees, so that the thin wall portions 37a–37i, which have the generally identical circumferential angular extents, are not continuously axially stacked one after the other. In this way, in the stator 30 of the present embodiment, the displacement angle of the thin wall portions 37a–37i periodically changes every eight inner core sheets 34. Thus, the thin wall portions 37a–37i, which have the generally identical displacement angles, are respectively axially placed once every eight inner core sheets 34.

In the present embodiment, as discussed above, all the circumferential angular extents of the thin wall portions 37a–37i of each inner core sheet 34 differ from one another. The thin wall portions 37a–37i, which have the generally identical circumferential angular extents, are not continuously axially stacked one after the other. Each thin wall portion 37a–37i is formed in the predetermined position, which is circumferentially displaced from the circumferential center of the corresponding bridge 36 by the predetermined angle. Furthermore, the thin wall portions 37a–37i, which have the generally identical displacement angles, are not continuously axially stacked one after the other. Thus, the noises and the vibrations, which are generated during the operation of the brushless motor M, are reduced.

(Thirteenth Embodiment)

Figure 22:
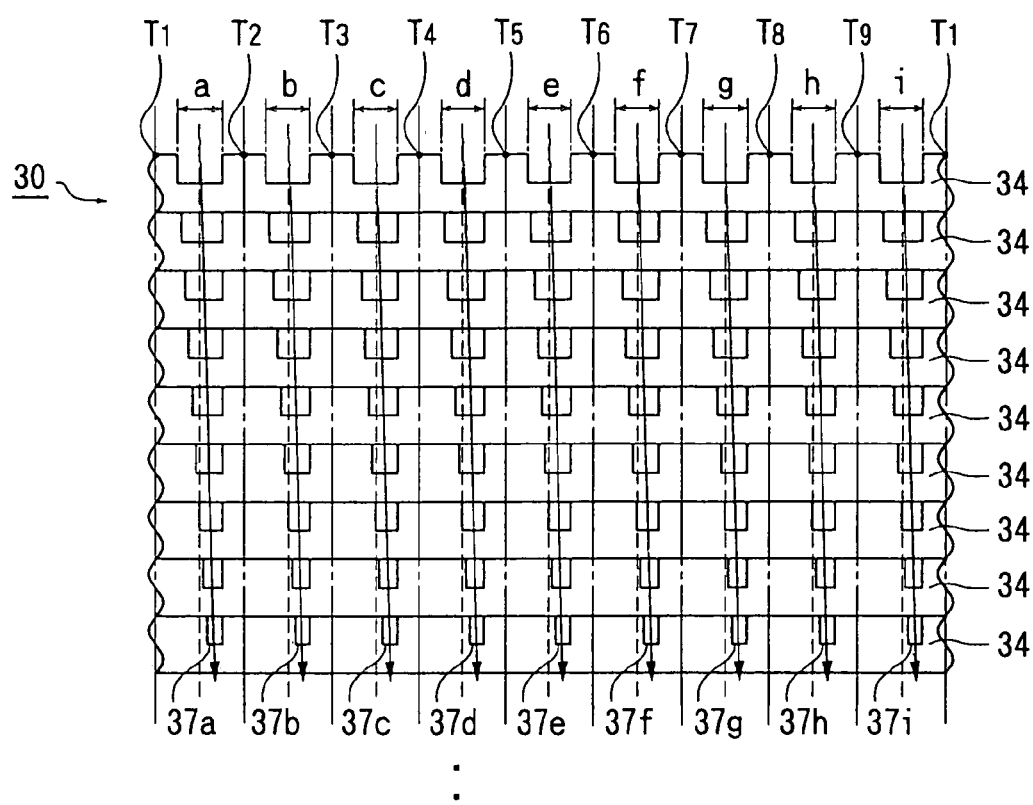
FIG. 22 is a partial schematic exploded view of a stator according to a thirteenth embodiment of the present invention.

A thirteenth embodiment, which is a modification of the fifth embodiment, of the present invention will be described with reference to FIG. 22. In the stator 30 of the thirteenth embodiment, similar to the fifth embodiment, all the circumferential angular extents of the thin wall portions 37a–37i of each inner core sheet 34 are generally identical, and the thin wall portions 37a–37i, which have the generally identical circumferential angular extents, are not continuously axially stacked one after the other.

More specifically, in the present embodiment, nine types of inner core sheets 34 are provided. The nine types of inner core sheets 34 respectively have about 12 degrees, about 11 degrees, about 10 degrees, about 9 degrees, about 8 degrees, about 7 degrees, about 6 degrees, about 5 degrees and about 4 degrees as the circumferential angular extent of each of the thin wall portions 37a–37i thereof.

However, unlike the fifth embodiment, in the nine types of inner core sheets 34, each thin wall portion 37a–37i is formed in a predetermined position, which is circumferentially displaced from the circumferential center of the corresponding bridge 36 by a predetermined angle. Specifically, each thin wall portion 37a–37i, which has the circumferential angular extent of about 12 degrees, has the displacement angle of about 0 degree. Each thin wall portion 37a–37i, which has the circumferential angular extent of about 11 degrees, has the displacement angle of about +0.5 degree. Each thin wall portion 37a–37i, which has the circumferential angular extent of about 10 degrees, has the displacement angle of about +1 degree. Each thin wall portion 37a–37i, which has the circumferential angular extent of about 9 degrees, has the displacement angle of about +1.5 degrees. Each thin wall portion 37a–37i, which has the circumferential angular extent of about 8 degrees, has the displacement angle of about +2 degrees. Each thin wall portion 37a–37i, which has the circumferential angular extent of about 7 degrees, has the displacement angle of about +2.5 degrees. Each thin wall portion 37a–37i, which has the circumferential angular extent of about 6 degrees, has the displacement angle of about +3 degrees. Each thin wall portion 37a–37i, which has the circumferential angular extent of about 5 degrees, has the displacement angle of about +3.5 degrees. Each thin wall portion 37a–37i, which has the circumferential angular extent of about 4 degrees, has the displacement angle of about +4 degrees. The nine types of inner core sheets 34 are repeatedly axially stacked in this order.

As discussed above, in the present embodiment, the thin wall portions 37a–37i, which have the generally identical circumferential angular extents, are not continuously axially stacked one after the other. Each thin wall portion 37a–37i is formed in the predetermined position, which is circumferentially displaced from the circumferential center of the corresponding bridge 36 by the predetermined angle. Furthermore, the thin wall portions 37a–37i, which have the generally identical displacement angles, are not continuously axially stacked one after the other between the corresponding iron core portions 35a–35i. Thus, the noises and the vibrations, which are generated during the operation of the brushless motor M, are reduced.

In the above first to thirteenth embodiments, the number of the magnetic poles is set to be eight, and the number of salient poles is set to be nine. However, the present invention is not limited to this, and thus any other combination of the number of the magnetic poles and the number of salient poles can be selected.

In the above embodiments, only the recesses 36a–36i are formed in the corresponding bridges 36 to form the thin wall portions 37a–37i. This may be modified as follows. A radial extent of each bridge 36 may be broadened, and an axial hole, which penetrates through the bridge 36, may be formed in the circumferential center of the thin wall portion 37a–37i alternative to or in addition to the recess 36a–36i. In this way, the magnetic resistance of the magnetic passage is increased, and the leakage of the magnetic flux is limited.

The above embodiments provide the following advantages.

(1) In the stator 30 of the first embodiment, the thin wall portions 37a–37i are formed in the bridges 36, each of which connects between the radially inner ends of corresponding two adjacent iron core portions 35a–35i, to limit leakage of the magnetic flux. The circumferential angular extents of the adjacent thin wall portions 37a–37i differ from one another.

With this arrangement, the leakage of the magnetic flux from the bridges 36 is limited to improve the output power of the brushless motor M. Furthermore, the torque oscillations in the cogging torque during the rotation of the rotor 20 are not concentrated in the single frequency component and are spread over the multiple frequency components. Thus, the noises and the vibrations are advantageously reduced.

(2) In the stator 30 of the second embodiment, all the circumferential angular extents of the thin wall portions 37a–37i are generally identical to one another. However, each thin wall portion 37a–37i is formed in the predetermined position, which is circumferentially displaced from the circumferential center of the corresponding bridge 36 by the predetermined angle.

With this arrangement, the brushless motor M of the second embodiment can limit the leakage of the magnetic flux at the bridges 36 to improve the output power of brushless motor M. Furthermore, the torque oscillations in the cogging torque are spread over the multiple frequency components. Thus, the noises and the vibrations are advantageously reduced.

(3) In the stator 30 of the third embodiment, the circumferential angular extents of the adjacent thin wall portions 37a–37i differ from one another, and each thin wall portion 37a–37i is formed in the predetermined position, which is circumferentially displaced from the circumferential center of the corresponding bridge 36 by the predetermined angle. Thus, the torque oscillations in the cogging torque can be more effectively spread over the multiple frequency components. Thereby, the noises and the vibrations, which are generated during the operation of the brushless motor, are advantageously reduced.

(4) In each bridge 36 of each inner core sheet 34, the recess 36 is formed in at least one of the upper side and the lower side to form the thin wall portion 37a–37i. With this arrangement, the noises and the vibrations, which are generated during the operation of the brushless motor M, are advantageously reduced.

(5) In the stators 30 of the fourth to thirteenth embodiments, the noises and the vibrations, which are generated during the operation of the brushless motor M, are advantageously reduced by appropriately selecting at least one of the differentiation of all the circumferential angular extents of the thin wall portions 37a–37i of each inner core sheet 34; the formation of each thin wall portion 37a–37i in the predetermined position, which is circumferentially displaced from the circumferential center of the corresponding bridge 36 by the corresponding predetermined angle; the avoidance of continuously axially stacking of the thin wall portions 37a–37i, which have the generally identical circumferential angular extents; and the avoidance of continuously axially stacking of the thin wall portions 37a–37i, which have the generally identical displacement angles.

Additional advantages and modifications will readily occur to those skilled in the art. The invention in its broader terms is therefore not limited to the specific details, representative apparatus, and illustrative examples shown and described.

What is claimed is:

1. A stator for a dynamo-electric machine, the stator comprising:
   a cylindrical outer core; and
   an inner core that includes a plurality of inner core sheets stacked one after the other in an axial direction of the stator, wherein each inner core sheet includes:
      a plurality of iron core portions, each of which extends radially inward from the outer core to hold a corresponding coil of the dynamo-electric machine; and
      a plurality of bridges, each of which connects between radially inner ends of corresponding two of the plurality of iron core portions, wherein:
   each bridge of each inner core sheet includes a thin wall portion, which extends in a circumferential direction of the stator and has a smaller axial thickness in a direction parallel to the axial direction of the stator in comparison to the rest of the inner core sheet; and
   a circumferential angular extent of at least one of the thin wall portions of the plurality of bridges differs from that of at least another one of the thin wall portions of the plurality of bridges in each inner core sheet.

2. The stator according to claim 1, wherein all the circumferential angular extents of the thin wall portions of the plurality of the bridges differ from one another in each inner core sheet.

3. The stator according to claim 1, wherein:
   all the circumferential angular extents of the thin wall portions of the plurality of the bridges differ from one another in each inner core sheet; and
   the circumferential angular extent of one of every axially adjacent two of the thin wall portions of the inner core sheets differs from the circumferential angular extent of the other one of the every axially adjacent two of the thin wall portions.

4. The stator according to claim 1, wherein:
   all the circumferential angular extents of the thin wall portions of the plurality of the bridges differ from one another in each inner core sheet;
   a circumferential center of the thin wall portion of each bridge is circumferentially displaced from a circumferential center of the bridge by a corresponding displacement angle in each inner core sheet;
   a first circumferential angular extent of one of every axially adjacent two of the thin wall portions of the inner core sheets is substantially the same as a corresponding second circumferential angular extent of the other one of the every axially adjacent two of the thin wall portions; and
   the displacement angle of the circumferential center of the one of the every axially adjacent two of the thin wall portions is substantially the same as the displacement angle of the circumferential center of the other one of the every axially adjacent two of the thin wall portions.

5. The stator according to claim 1, wherein:
all the circumferential angular extents of the thin wall portions of the plurality of the bridges differ from one another in each inner core sheet;
a circumferential center of the thin wall portion of each bridge is circumferentially displaced from a circumferential center of the bridge by a corresponding displacement angle in each inner core sheet;
the circumferential angular extent of one of every axially adjacent two of the thin wall portions of the inner core sheets differs from the circumferential angular extent of the other one of the every axially adjacent two of the thin wall portions; and
the displacement angle of the circumferential center of the one of the every axially adjacent two of the thin wall portions is substantially the same as the displacement angle of the circumferential center of the other one of the every axially adjacent two of the thin wall portions.

6. The stator according to claim 1, wherein all the iron core portions are arranged at irregular intervals in the circumferential direction of the stator in each inner core sheet.

7. The stator according to claim 1, wherein the thin wall portion of each bridge is formed by axially recessing at least one of two opposed surfaces of the bridge, which are opposed to each other in the direction parallel to the axial direction of the stator.

8. The stator according to claim 1, wherein:
the plurality of inner core sheets includes first to third types of the inner core sheets, which are axially stacked in this order;
the thin wall portion of each bridge of the first type of the inner core sheet is formed by axially recessing one of two opposed surfaces of the bridge, which are opposed to each other in the direction parallel to the axial direction of the stator;
the thin wall portion of each bridge of the second type of the inner core sheet is formed by axially recessing both the two opposed surfaces of the bridge; and
the thin wall portion of each bridge of the third type of the inner core sheet is formed by axially recessing the other one of the two opposed surfaces of the bridge.

9. A stator for a dynamo-electric machine, the stator comprising:
a cylindrical outer core; and
an inner core that includes a plurality of inner core sheets stacked one after the other in an axial direction of the stator, wherein each inner core sheet includes:
a plurality of iron core portions, each of which extends radially inward from the outer core to hold a corresponding coil of the dynamo-electric machine; and
a plurality of bridges, each of which connects between radially inner ends of corresponding two of the plurality of iron core portions, wherein:
each bridge of each inner core sheet includes a thin wall portion, which extends in a circumferential direction of the stator and has a smaller axial thickness in a direction parallel to the axial direction of the stator in comparison to the rest of the inner core sheet; and
a circumferential center of the thin wall portion of each bridge is circumferentially displaced from a circumferential center of the bridge by a corresponding displacement angle in each inner core sheet.

10. The stator according to claim 9, wherein the displacement angle of the circumferential center of one of every axially adjacent two of the thin wall portions of the inner core sheets differs from the displacement angle of the circumferential center of the other one of the every axially adjacent two of the thin wall portions.

11. The stator according to claim 9, wherein:
all circumferential angular extents of the thin wall portions are generally identical to one another in each corresponding inner core sheet;
all the displacement angles of the circumferential centers of the thin wall portions are generally identical to one another in each corresponding inner core sheet;
the displacement angle of the circumferential center of one of every axially adjacent two of the thin wall portions of the inner core sheets is offset from the displacement angle of the circumferential center of the other one of the every axially adjacent two of the thin wall portions.

12. The stator according to claim 11, wherein identical ones of the thin wall portions, which are generally identical to one another in terms of the displacement angle, are respectively axially placed once every predetermined number of the inner core sheets.

13. The stator according to claim 11, wherein:
the plurality of inner core sheets includes a plurality of first type inner core sheets and a plurality of second type inner core sheets;
each first type inner core sheet differs from each second type inner core sheet with respect to at least one of the displacement angles of the thin wall portions; and
the plurality of first type inner core sheets and the plurality of second type inner core sheets are axially alternately stacked.

14. The stator according to claim 9, wherein:
all circumferential angular extents of the thin wall portions are generally identical to one another in each corresponding inner core sheet;
every circumferentially adjacent two of the thin wall portions are displaced in opposite directions, respectively, in each inner core sheet, so that the circumferential center of one of the every circumferentially adjacent two of the thin wall portions is circumferentially displaced from the circumferential center of the associate bridge by a predetermined negative angle, and the circumferential center of the other one of the every circumferentially adjacent two of the thin wall portions is circumferentially displaced from the circumferential center of the associated bridge by a predetermined positive angle, wherein an absolute value of the predetermined negative angle is generally the same as an absolute value of the predetermined positive angle; and
the displacement angle of the circumferential center of one of every axially adjacent two of the thin wall portions of the inner core sheets differs from the displacement angle of the circumferential center of the other one of the every axially adjacent two of the thin wall portions.

15. The stator according to claim 14, wherein:
the plurality of inner core sheets includes a plurality of types of inner core sheets, which differ from one another with respect to at least one of the displacement angles of the thin wall portions; and
each of the plurality of types of inner core sheets is axially placed once every predetermined number of the inner core sheets, so that identical ones of the thin wall portions, which are identical to one another in terms of the displacement angle, are respectively axially placed once every predetermined number of the inner core sheets.

16. The stator according to claim 9, wherein:
all the circumferential angular extents of the thin wall portions of the plurality of the bridges differ from one another in each inner core sheet;
all the displacement angles of the circumferential centers of the thin wall portions are generally identical to one another in each corresponding inner core sheet; and
the displacement angle of the circumferential center of one of every axially adjacent two of the thin wall portions of the inner core sheets is offset from the displacement angle of the circumferential center of the other one of the every axially adjacent two of the thin wall portions.

17. The stator according to claim 16, wherein identical ones of the thin wall portions, which are generally identical to one another in terms of the displacement angle, are respectively axially placed once every predetermined number of the inner core sheets.

18. The stator according to claim 16, wherein the circumferential angular extent of the one of the every axially adjacent two of the thin wall portions of the inner core sheets is substantially the same as the circumferential angular extent of the other one of the every axially adjacent two of the thin wall portions.

19. The stator according to claim 16, wherein the circumferential angular extent of the one of the every axially adjacent two of the thin wall portions of the inner core sheets differs from the circumferential angular extent of the other one of the every axially adjacent two of the thin wall portions.

20. The stator according to claim 9, wherein:
all circumferential angular extents of the thin wall portions are generally identical to one another in each corresponding inner core sheet;
all the displacement angles of the circumferential centers of the thin wall portions are generally identical to one another in each corresponding inner core sheet;
a first circumferential angular extent of one of every axially adjacent two of the thin wall portions of the inner core sheets differs from a corresponding second circumferential angular extent of the other one of the every axially adjacent two of the thin wall portions; and
the displacement angle of the circumferential center of the one of the every axially adjacent two of the thin wall portions is offset from the displacement angle of the circumferential center of the other one of the every axially adjacent two of the thin wall portions.

21. The stator according to claim 9, wherein a circumferential angular extent of at least one of the thin wall portions of the plurality of bridges differs from that of at least another one of the thin wall portions of the plurality of bridges in each inner core sheet.

22. A stator for a dynamo-electric machine, the stator comprising:
a cylindrical outer core; and
an inner core that includes a plurality of inner core sheets stacked one after the other in an axial direction of the stator, wherein each inner core sheet includes:
a plurality of iron core portions, each of which extends radially inward from the outer core to hold a corresponding coil of the dynamo-electric machine; and
a plurality of bridges, each of which connects between radially inner ends of corresponding two of the plurality of iron core portions, wherein:
each bridge of each inner core sheet includes a thin wall portion, which extends in a circumferential direction of the stator and has a smaller axial thickness in a direction parallel to the axial direction of the stator in comparison to the rest of the inner core sheet;
all circumferential angular extents of the thin wall portions of the plurality of bridges are generally identical to one another in each corresponding inner core sheet; and
a first circumferential angular extent of one of every axially adjacent two of the thin wall portions of the inner core sheets differs from a corresponding second circumferential angular extent of the other one of the every axially adjacent two of the thin wall portions.

23. The stator according to claim 22, wherein:
a circumferential center of the thin wall portion of each bridge is circumferentially displaced from a circumferential center of the bridge by a corresponding displacement angle in each inner core sheet; and
the displacement angle of the circumferential center of the one of the every axially adjacent two of the thin wall portions is substantially the same as the displacement angle of the circumferential center of the other one of the every axially adjacent two of the thin wall portions.

24. The stator according to claim 9, wherein:
the displacement angle of the circumferential center of one of every axially adjacent two of the thin wall portions of the inner core sheets is a positive angle; and
the displacement angle of the circumferential center of the other one of the every axially adjacent two of the thin wall portions is a negative angle.

* * * * *